United States Patent
Meyer et al.

(10) Patent No.: US 10,581,620 B2
(45) Date of Patent: Mar. 3, 2020

(54) SCALABLE CERTIFICATE MANAGEMENT SYSTEM ARCHITECTURES

(71) Applicant: INTEGRITY Security Services, Inc., Irvine, CA (US)

(72) Inventors: Alan T. Meyer, Anaheim Hills, CA (US); Gregory A. Powell, Ladera Ranch, CA (US)

(73) Assignee: INTEGRITY SECURITY SERVICES LLC, Santa Barbara, CA (US)

( * ) Notice: Subject to any disclaimer, the term of this patent is extended or adjusted under 35 U.S.C. 154(b) by 0 days.

(21) Appl. No.: 16/029,559

(22) Filed: Jul. 7, 2018

(65) Prior Publication Data

US 2018/0316511 A1    Nov. 1, 2018

Related U.S. Application Data

(63) Continuation-in-part of application No. 15/812,510, filed on Nov. 14, 2017.
(Continued)

(51) Int. Cl.
*H04L 29/06* (2006.01)
*H04L 9/32* (2006.01)
*G06F 9/455* (2018.01)

(52) U.S. Cl.
CPC ........ *H04L 9/3268* (2013.01); *G06F 9/45558* (2013.01); *G06F 2009/45587* (2013.01)

(58) Field of Classification Search
CPC .................................................. H04L 9/3268
See application file for complete search history.

(56) References Cited

U.S. PATENT DOCUMENTS

| 7,707,405 B1 | 4/2010 | Gilman et al. |
| 8,631,247 B2 | 1/2014 | O'Loughlin et al. |

(Continued)

OTHER PUBLICATIONS

Whyte, William, et al. "A security credential management system for V2V communications." 2013 IEEE Vehicular Networking Conference. IE.*

(Continued)

*Primary Examiner* — Harris C Wang
(74) *Attorney, Agent, or Firm* — MH2 Technology Law Group LLP

(57) ABSTRACT

Scalable certificate management system architectures. An example system may include one or more application platforms (e.g., VMs) that run a registration authority and are communicatively connected to one or more compute engines that perform cryptographic computations required by the registration authority. The system may also include one or more application platforms that run an enrollment certificate authority and that are communicatively connected to one or more compute engines that perform cryptographic computations required by the enrollment certificate authority. It may further include one or more application platforms that run a pseudonym certificate authority and that are communicatively connected to one or more compute engines that perform cryptographic computations required by the pseudonym certificate authority. It may also include one or more application platforms that run first and second linkage authorities and that are communicatively connected to one or more compute engines that perform cryptographic computations required by the linkage authorities.

20 Claims, 16 Drawing Sheets

Related U.S. Application Data

(60) Provisional application No. 62/421,878, filed on Nov. 14, 2016, provisional application No. 62/421,852, filed on Nov. 14, 2016, provisional application No. 62/487,909, filed on Apr. 20, 2017.

(56) References Cited

U.S. PATENT DOCUMENTS

| | | | |
|---|---|---|---|
| 9,183,158 | B2 | 11/2015 | O'Loughlin et al. |
| 9,191,203 | B2 | 11/2015 | Rooyakkers et al. |
| 9,467,297 | B2 | 10/2016 | Clish et al. |
| 9,485,223 | B2 | 11/2016 | Daskalopoulos et al. |
| 9,678,896 | B2 | 6/2017 | O'Loughlin et al. |
| 9,887,975 | B1* | 2/2018 | Gifford ............... H04W 12/10 |
| 10,003,580 | B2 | 6/2018 | Daskalopoulos et al. |
| 10,027,490 | B2* | 7/2018 | Tschache ............. H04L 9/3268 |
| 2009/0191857 | A1 | 7/2009 | Horn et al. |
| 2011/0191581 | A1* | 8/2011 | Shim ...................... H04L 67/12 |
| | | | 713/158 |
| 2014/0004827 | A1 | 1/2014 | O'Leary |
| 2014/0181504 | A1 | 6/2014 | Almahallawy et al. |
| 2014/0280595 | A1 | 9/2014 | Mani et al. |
| 2015/0222621 | A1 | 8/2015 | Baum et al. |
| 2016/0044001 | A1 | 2/2016 | Pogorelik et al. |
| 2016/0078213 | A1 | 3/2016 | Rooyakkers et al. |
| 2016/0112206 | A1* | 4/2016 | Cizas .................... H04L 9/3263 |
| | | | 713/158 |
| 2016/0150400 | A1 | 5/2016 | Cha et al. |
| 2016/0165433 | A1 | 6/2016 | Larignon et al. |
| 2016/0248746 | A1 | 8/2016 | James et al. |
| 2016/0285840 | A1 | 9/2016 | Smith |
| 2017/0006135 | A1* | 1/2017 | Siebel .................... H04L 67/02 |
| 2017/0093584 | A1 | 3/2017 | Clish et al. |
| 2017/0222990 | A1* | 8/2017 | Romansky ............. H04L 63/06 |
| 2017/0295491 | A1 | 10/2017 | Gehrmann |
| 2018/0027410 | A1 | 1/2018 | Berard et al. |
| 2018/0081669 | A1 | 3/2018 | Becker et al. |
| 2018/0137261 | A1* | 5/2018 | Lattin ..................... G06F 21/12 |
| 2018/0159856 | A1 | 6/2018 | Gujarathi |
| 2018/0316511 | A1* | 11/2018 | Meyer ................... H04L 9/3268 |
| 2019/0116048 | A1* | 4/2019 | Chen ..................... H04L 9/3268 |

OTHER PUBLICATIONS

GSMA, "GSMA Embedded SIM Specification Remote SIM Provisioning for M2M", 2014, pp. 1-36.

PTO Non-Final dated Aug. 27, 2018, U.S. Appl. No. 15/812,510, pp. 1-30.

PCT International Search Report and the Written Opinion of the International Searching Authority, International Application No. PCT/US2017/061511, dated Jan. 23, 2018, pp. 1-10.

William Whyte et al., "A Security Credential Management System for V2V Communications", Vehicular Networking Conference (VNC), Dec. 2013, IEEE, pp. 1-8.

Kevin Gay, "Security Credential Management System—Operations and Management" Powerpoint slides, USDOT Plugfest, Nov. 2016, pp. 1-15.

Xin Wang (Authorized Officer), International Preliminary Report on Patentability dated May 23, 2019, PCT Application No. PCT/US2017/061511, pp. 1-9.

Lee W. Young, International Search Report and Written Opinion dated Oct. 2, 2019, PCT Application No. PCT/US2019/040064, pp. 1-9.

Notice of Allowance dated May 29, 2019, U.S. Appl. No. 15/812,510, pp. 1-29.

Corrected Notice of Allowance dated Jun. 6, 2019, U.S. Appl. No. 15/812,510, pp. 1-6.

Supplemental Notice of Allowance dated Aug. 1, 2019, U.S. Appl. No. 15/812,510, pp. 1-6.

* cited by examiner

SCALABLE CERTIFICATE MANAGEMENT SYSTEM ARCHITECTURES

CROSS-REFERENCE TO RELATED APPLICATIONS

This application is a continuation-in-part of U.S. application Ser. No. 15/812,510 filed on 14 Nov. 2017, which claims the benefit of U.S. Provisional Application No. 62/421,878 filed on 14 Nov. 2016; and of U.S. Provisional Application No. 62/421,852 filed on 14 Nov. 2016; and of U.S. Provisional Application No. 62/487,909 filed on 20 Apr. 2017; all of which are hereby incorporated by reference in their entireties.

FIELD OF THE INVENTION

This invention relates to the systems, devices, and methods for the secure provisioning of computerized devices.

BACKGROUND

As computers have become ever more miniaturized and commoditized, manufacturers are producing more and more varied devices that include one or more embedded computer or processor. The computer in a computerized device can control the device's operation; collect, store, and share data; communicate with other computers and other computerized devices; and update its own software, among other things.

The Internet of things (IoT) is the network of computerized physical devices that have embedded processor(s), electronics, software, data, sensors, actuators, and/or network connectivity, which enable these devices to connect and exchange data via digital networks, including the Internet, cellular networks, and other wireless networks. Typically, each "thing" is uniquely identifiable through its embedded computing system, and is able to inter-operate within the existing Internet infrastructure.

"Things", in the IoT sense, can refer to a wide variety of computerized devices, such as consumer appliances, enterprise devices used in business and corporate settings, manufacturing machines, farming equipment, energy-consuming devices in homes and buildings (switches, power outlets, appliances, lighting systems, bulbs, televisions, garage door openers, sprinkler systems, security systems, etc.), medical and healthcare devices, infrastructure management devices, robots, drones, and transportation devices and vehicles, among many others.

For example, most, if not all, modern vehicles and transportation machinery (e.g., automobiles, trucks, aircraft, trains, watercraft, motorcycles, scooters, and the like) contain several embedded processors or embedded computers in their subsystems, and are computer-controlled in at least some aspects. Similarly, a growing number of modern transportation infrastructure devices (e.g., traffic lights, traffic cameras, traffic sensors, bridge monitors, bridge control systems, and the like) contain at least one, and often many, embedded processors or embedded computer systems, and are computer-controlled in at least some aspects. These computer-controlled elements of the transportation network typically communicate with each other, passing various types of information back and forth, and they may react, respond, change their operation, or otherwise depend upon the information received/sent from/to other vehicles in Vehicle-to-Vehicle (V2V; also known as C2C, Car-to-Car) communications and/or from/to infrastructure elements in Vehicle-to-Infrastructure (V2I, also known as C2I, Car-to-Infrastructure) communications for safe, correct, efficient, and reliable operation.

The computers in computerized devices operate according to their software and/or firmware and data. In order to ensure safe and proper operation, the computerized devices must be properly initialized and updated with the proper software, firmware, executable instructions, digital certificates (e.g., public key certificates), cryptographic keys and the like (hereinafter collectively referred to as "digital assets" or "software") as intended by the manufacturer, so that the IoT consists only of devices that are executing authorized, known-to-be-good software and data. Problems arise, however, when unauthorized persons or organizations (e.g., hackers) replace or change the software in computerized devices. Problems also arise when older software, untested software, unapproved software, and/or software with known bugs is installed in computerized devices.

Accordingly, it is desirable to provide improved systems, methods and techniques for securely provisioning the digital assets in computerized devices, so as to prevent the computerized devices from operating using error-ridden, incorrectly functioning, untested, maliciously altered, or otherwise undesirable software and data.

SUMMARY

Disclosed herein are systems, methods and devices for securely generating and providing certain types of digital assets such as security credentials and digital certificates. In various implementations, the systems, methods, and devices use a scalable certificate management system (CMS) to create and provide certain types of digital assets such as security credentials and public key certificates. In some implementations, the CMS provides certificates such as enrollment certificates and pseudonym certificates in response to requests for such certificates.

In various implementations, the CMS has a scalable architecture that includes a registration authority, one or more linkage authorities, a pseudonym certificate authority, and an enrollment certificate authority. An example CMS may include one or more application platforms that run a registration authority application and are communicatively connected to one or more compute engines that perform cryptographic computations required by the registration authority application. The one or more application platforms may include one or more virtual machines (VMs) or one or more hardware platforms (e.g., servers, computers, or other computer hardware capable of hosting and executing a software application). The system may also include one or more VMs that run an enrollment certificate authority and that are communicatively connected to one or more compute engines that perform cryptographic computations required by the enrollment certificate authority. The enrollment certificate authority application is operable to generate and conditionally transmit enrollment certificates to the registration authority application. The example CMS may further include one or more VMs that run a pseudonym certificate authority application and that are communicatively connected to one or more compute engines that perform cryptographic computations required by the pseudonym certificate authority. The pseudonym certificate authority application is operable to generate and conditionally transmit pseudonym certificates to the registration authority application. The CMS system may also include one or more VMs that run first and second linkage authorities and that are communicatively connected to one or more compute engines that perform cryptographic computations required by the first and second linkage authorities. The first linkage authority application and the second linkage authority application may be operable to generate and conditionally transmit linkage values to the registration authority application.

In some implementations, a scalable CMS for securely providing certificates to a provisioning controller includes one or more application platforms that run a registration authority application and that are communicatively connected to one or more compute engines that perform cryptographic computations required by the registration authority application; one or more application platforms that run an enrollment certificate authority application and that are communicatively connected to one or more compute engines that perform cryptographic computations required by the enrollment certificate authority application, which may be operable to generate and conditionally transmit enrollment certificates to the registration authority application; one or more application platforms that run a pseudonym certificate authority application and that are communicatively connected to one or more compute engines that perform cryptographic computations required by the pseudonym certificate authority application, which may be operable to generate and conditionally transmit pseudonym certificates to the registration authority application; one or more application platforms that run a first linkage authority application and that are communicatively connected to one or more compute engines that perform cryptographic computations required by the first linkage authority application; and one or more application platforms that run a second linkage authority application and that are communicatively connected to one or more compute engines that perform cryptographic computations required by the second linkage authority application. The linkage authority applications may be operable to generate and conditionally transmit linkage values to the registration authority application.

In other implementations, the CMS may further include one or more databases that are operably connected to the one or more application platforms that run the registration authority application, the one or more application platforms that run the enrollment certificate authority application, the one or more application platforms that run the pseudonym certificate authority application, the one or more application platforms that run the first linkage authority application, and the one or more application platforms that run the second linkage authority application.

In yet other implementations, each of the registration authority application, the enrollment certificate authority application, the pseudonym certificate authority application, the first linkage authority application, the second linkage authority application, and the one or more database may be operable to be scaled independently from each other.

In still other implementations, the enrollment certificate authority application may be operable to generate enrollment certificates in response to receiving requests for enrollment certificates from the registration authority application; the enrollment certificate authority application may be operable to generate pseudonym certificates in response to receiving requests for pseudonym certificates from the registration authority application; and the first linkage authority application and the second linkage authority application may be operable to generate linkage values in response to receiving requests for linkage values from the registration authority application.

In some implementations, each of the registration authority application, the enrollment certificate authority application, the pseudonym certificate authority application, the first linkage authority application, and the second linkage authority application may be communicatively connected to each other by a message queuing service comprising a plurality of message queues.

In certain implementations, the one or more application platforms that run the enrollment certificate authority application are one or more virtual machines that are communicatively connected to the one or more compute engines that perform the cryptographic computations required by the enrollment certificate authority application by a first plurality of message queues; the one or more application platforms that run the first linkage authority application are one or more virtual machines that are communicatively connected to the one or more compute engines that perform the cryptographic computations required by the first linkage authority application by a second plurality of message queues; and the one or more application platforms that run the second linkage authority application are one or more virtual machines that are communicatively connected to the one or more compute engines that perform the cryptographic computations required by the second linkage authority application by a third plurality of message queues.

According to some implementations with first, second, and third pluralities of message queues, the first plurality of message queues includes: a first message queue for queuing messages to be delivered to the one or more virtual machines that run the enrollment certificate authority application; and a second message queue for queuing messages to be delivered to the one or more compute engines that perform the cryptographic computations required by the enrollment certificate authority application; the second plurality of message queues comprises: a third message queue for queuing messages to be delivered to the one or more virtual machines that run the first linkage authority application; and a fourth message queue for queuing messages to be delivered to the one or more compute engines that perform the cryptographic computations required by the first linkage authority application; and the third plurality of message queues comprises: a fifth message queue for queuing messages to be delivered to the one or more virtual machines that run the second linkage authority application; and a sixth message queue for queuing messages to be delivered to the one or more compute engines that perform the cryptographic computations required by the second linkage authority application.

In other implementations having first, second, and third pluralities of message queues, the first plurality of message queues comprises: a first bidirectional message queue for queuing messages to be delivered to and sent from the one or more virtual machines that run the enrollment certificate authority application; and a second bidirectional message queue for queuing messages to be delivered to and sent from the one or more compute engines that perform the cryptographic computations required by the enrollment certificate authority application; the second plurality of message queues comprises: a third bidirectional message queue for queuing messages to be delivered to and sent from the one or more virtual machines that run the first linkage authority application; and a fourth bidirectional message queue for queuing messages to be delivered to and sent from the one or more compute engines that perform the cryptographic computations required by the first linkage authority application; and the third plurality of message queues comprises: a fifth bidirectional message queue for queuing messages to be delivered to and sent from the one or more virtual machines that run the second linkage authority application; and a sixth bidirectional message queue for queuing messages to be delivered to and sent from the one or more compute engines that perform the cryptographic computations required by the second linkage authority application.

In other implementations of the CMS, the one or more application platforms that run the enrollment certificate authority application are communicatively connected to the one or more compute engines that perform the cryptographic computations required by the enrollment certificate authority application by a first load balancer; the one or more application platforms that run the first linkage authority application are communicatively connected to the one or more compute engines that perform the cryptographic computations required by the first linkage authority application by a second load balancer; and the one or more application platforms that run the second linkage authority application are communicatively connected to the one or more compute engines that perform the cryptographic computations required by the second linkage authority application by a third load balancer.

In certain implementations of the CMS that include the first, second, and third load balancers, each of the load balancers may comprise one or more of a load balancer virtual machine and a load balancer server; and the load balancer virtual machine and the load balancer server are each configured to distribute workload across a plurality of application platforms and a plurality of compute engines.

In other implementations having the load balancer virtual machine and the load balancer server, the load balancer virtual machine and the load balancer server are each configured to distribute workload across the plurality of application platforms and the plurality of compute engines using a round robin technique.

In still other implementations including the load balancer virtual machine and the load balancer server, the load balancer virtual machine and the load balancer server are each configured to distribute workload across the plurality of application platforms and the plurality of compute engines based on a respective workload reported by each of the plurality of application platforms and each of the plurality of compute engines.

In various implementations, the provisioning controller may be operable to: transmit, on behalf of a computerized device, a request for an enrollment certificate to the registration authority application; receive, from the registration authority application, the enrollment certificate, which may be generated by the enrollment certificate authority application; transmit the enrollment certificate to the computerized device; transmit, on behalf of the computerized device, a request for a plurality of pseudonym certificates to the registration authority application; receive, from the registration authority application, the plurality of pseudonym certificates, which may be generated by the pseudonym certificate authority application; transmit the plurality of pseudonym certificates to the computerized device; create and maintain a log that is associated with the computerized device; and store information regarding the certificate activities for the computerized device.

In some implementations where the provisioning controller may be operable to create and maintain the log, the provisioning controller may be further operable to transmit information regarding certificate activities related to the computerized device to the provisioning controller for storing in the log.

In certain implementations where the provisioning controller may be operable to transmit a request for an enrollment certificate to the registration authority application, the provisioning controller may be further operable to authenticate the computerized device before transmitting the request for the enrollment certificate to the registration authority application.

In other implementations, an enrollment certificate may be a public key certificate identifying a holder of the public key certificate as an authorized participant in an ecosystem including a plurality of computerized devices, and each authorized participant in the ecosystem may be able to receive one or more pseudonym certificates that enable communications with the plurality of computerized devices.

In some implementations, a system for provisioning one or more computerized devices includes a distributor appliance that is communicatively connected to the computerized device, and that is operable to receive a digital asset and to load the digital asset into the computerized device; a digital asset management system that is connected via a first secure communication channel to the distributor appliance, and that is operable to generate and conditionally transmit the digital asset to the distributor appliance; and a provisioning controller that is connected via a second secure communication channel to the distributor appliance and is connected via a third secure communication channel to the digital asset management system, and that is operable to direct the digital asset management system to transmit the digital asset to the distributor appliance. The computerized device may be nonfunctional or only partially functional before the digital asset is loaded into the computerized device, due to the absence of the digital asset. The digital asset may be at least one of a digital certificate, a cryptographic key, and executable software. In certain implementations, the system may interact with or receive credentials from a scalable CMS In various implementations, the system may further include a second distributor appliance that is connected via a fourth secure communication channel to the digital asset management system and that is communicatively connected to the computerized device after the distributor appliance is disconnected, and that is operable to receive a second digital asset and to load the second digital asset into the computerized device, and the provisioning controller is further operable to direct the digital asset management system to transmit the second digital asset to the distributor appliance. The computerized device may be fully functional after the second digital asset is loaded into the computerized device.

In various implementations, the digital asset management system may further include one or more application platforms that run a registration authority application and that are communicatively connected to one or more compute engines that perform cryptographic computations required by the registration authority application; one or more application platforms that run an enrollment certificate authority application and that are communicatively connected to one or more compute engines that perform cryptographic computations required by the enrollment certificate authority application; one or more application platforms that run a pseudonym certificate authority application and that are communicatively connected to one or more compute engines that perform cryptographic computations required by the pseudonym certificate authority application; one or more application platforms that run a first linkage authority application and that are communicatively connected to one or more compute engines that perform cryptographic computations required by the first linkage authority application; and one or more application platforms that run a second linkage authority application and that are communicatively connected to one or more compute engines that perform cryptographic computations required by the second linkage authority application.

In other implementations, the digital asset management system may further include one or more databases that are operably connected to the one or more application platforms that run the registration authority application, the one or more application platforms that run the enrollment certificate authority, the one or more application platforms application that run the pseudonym certificate authority application, the one or more application platforms that run the first linkage authority application, and the one or more application platforms that run the second linkage authority application.

In still other implementations, the system may further include a portal that is operably connected to the provisioning controller and that authenticates a manufacturer of the computerized device and enables the manufacturer to manage provisioning of the computerized device, and/or a portal that is operably connected to the provisioning controller and that authenticates an installer of the computerized device and enables the installer to manage provisioning of the computerized device, and/or a portal that is operably connected to the provisioning controller and that authenticates a regulator of the computerized device and enables the regulator to regulate provisioning of the computerized device.

In yet other implementations, the provisioning controller may be further operable to transmit a digital asset (e.g., an executable software image) to the distributor appliance for loading into the computerized device. In yet other implementations, the provisioning controller may be further operable to create and maintain a log that is associated with the digital device and that stores information regarding the provisioning activities for the digital device, and the distributor appliance may be further operable to transmit information regarding provisioning activities related to the digital device to the provisioning controller for storing in the log.

In yet other implementations, the provisioning controller may be further operable to authenticate the digital device before directing the digital asset management system to transmit the digital asset.

BRIEF DESCRIPTION OF THE DRAWINGS

The accompanying drawings, which are incorporated into and constitute a part of this specification, illustrate implementations of the invention and together with the description, serve to explain the principles of the invention. In the figures.

DETAILED DESCRIPTION

Figure 1:
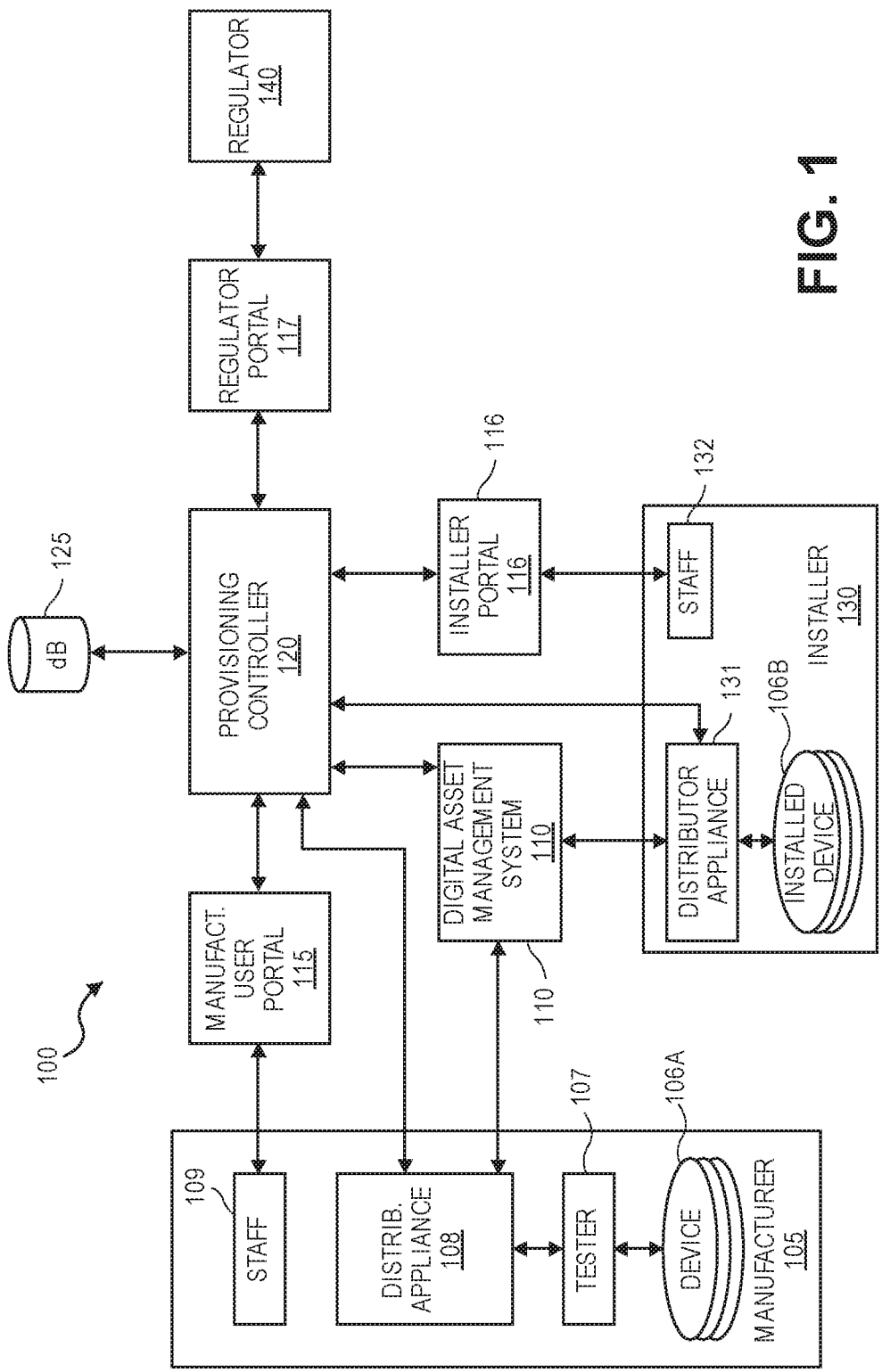
FIG. 1 is a block diagram showing an example of a system for secure provisioning, consistent with implementations of the invention.

Reference will now be made in detail to various implementations of the invention, examples of which are illustrated in the accompanying drawings. Wherever convenient, the same reference numbers will be used throughout the drawings to refer to the same or like parts.

In order to ensure safe and proper operation in the field, embedded devices, for instance, the Electronic Control Unit (ECUs) used in vehicles, need to be properly initialized during manufacturing by provisioning digital assets, such as security assets. Digital assets could include various cryptographic keys, a unique identifier, digital certificates, and software. In most cases, the origin of these digital assets and manufacturing factories are located in different geographical locations, which are conventionally interconnected via insecure Internet communications. It is therefore desirable to create an end-to-end secure channel from the origin of these digital assets to the device, such that the digital assets cannot be accessed or modified by malicious parties or by accident.

There are drawbacks to traditional network security protocols for end-to-end protection, such as TLS/SSL, in that they require either pre-shared keys or certain secret security materials to pre-exist at both communicating parties. This creates a cyclic technical problem in that, in order to provision digital assets, some initial secret materials must pre-exist. This problem includes how to protect the initial secret materials. This problem is especially acute for computerized devices because, to simplify logistics, typically a single version of the initial software is loaded on the computerized device during manufacturing. If this initial software must contain initial security materials, this requires a global secret to exist. As a consequence, compromising the initial security materials will lead to compromise of all digital assets provisioned on all devices, as they all share the same global secret. Systems, methods and devices consistent with the present disclosure address these and other problems of conventional provisioning systems.

Provisioning generally refers to the set of actions taken to prepare a computerized device with appropriate data and software. It may also include the set of actions taken to properly install the device in its operational environment, making it ready for operation. The actions include loading the appropriate digital assets (e.g., operating system, device drivers, middleware, applications, digital certificates, and the like) into a digital storage (e.g., memory) of the device, and appropriately customizing and configuring certain digital assets on the device (if needed), which digital assets may be unique to each particular device. The actions may also include verifying that the computerized device is a legitimate device created by a legitimate device manufacturer, and not a copy or a counterfeit device.

The actions may also include correctly installing the device into its operational environment and testing it to verify that it is operating properly. The ability to securely provision only known-to-be-good devices is complicated by the fact that the devices may be built by one manufacturer and later installed by another into a larger system or device—for example an On Board Unit (OBU) built by a component manufacturer may be installed into a car built by the car manufacturer. An improperly installed device may function incorrectly.

Various implementations consistent with the present invention provide secure provisioning of computerized devices, including IoT devices. Such implementations serve to prevent or inhibit the malicious, negligent, or mistaken tampering, altering, updating, or releasing of digital assets that are used by the computerized devices, and prevent or inhibit the improper installation of the computerized devices and their software.

Various implementations consistent with the present invention may also produce audit logs, records, reports, and the like, of the secure provisioning process, which may be used to analyze and resolve later-discovered problems.

Various implementations consistent with the present invention may also provide a secure provisioning and management platform, which may be provided as a service to device and system manufacturers.

FIG. 1 is a block diagram showing an example of a system 100 for secure provisioning of computerized devices, consistent with implementations of the invention. As shown in the example of FIG. 1, the system 100 includes a provisioning controller 120. The provisioning controller 120 may be implemented as a server computer (e.g., having at least one processor and associated memory) with an embedded hardware security module (HSM) that securely generates and stores digital security assets and that securely performs a variety of cryptographic and sensitive computations. The HSM protects digital security assets, such as cryptographic keys, and other sensitive data from possible access by an attacker. In various implementations, the provisioning controller 120 functions to authenticate and securely communicate with users of the system 100; securely communicate with and manage one or more distributor appliances 108, 131; securely communicate with and direct the operations of a digital asset management system (DAMS) 110; create and store provisioning records; create, store and distribute provisioning records; create, store and distribute audit logs; create and distribute certificates to cryptographically bind together the DAMS 110 and distributor appliance 108, 131 elements; revoke users and managed devices as needed if they cease to be trusted; and create and distribute secure encrypted backups of critical keys and data for offsite storage for business continuity and disaster recovery.

As shown in the example of FIG. 1, the provisioning controller 120 is communicatively connected to a database 125, which may store data, information, and digital assets related to securely provisioning the devices 106a, 106b, (which may be collectively referred to as 106).

The provisioning controller 120 is also securely communicatively connected to a manufacturer's user portal 115, which may be implemented, e.g., as a server or as an interface to the provisioning controller 120. In various implementations, the staff 109 of a device manufacturer 105 may use the manufacturer's user portal 115 to interface with the provisioning controller 120 (and thus the DAMS 110) and manage their device provisioning activities. In various implementations, the manufacturer's user portal 115 may collect identifying information from a staff user 109, such as username, password, two-factor identification data, a facial recognition image, a fingerprint, etc., and provide the identifying information to the provisioning controller 120. The provisioning controller 120 may authenticate the staff 109 before allowing the staff 109 to access the secure provisioning system 100. For example, the provisioning controller 120 may look up identifying information that is associated with the staff user 109 and that was previously verified and stored in its database 125, and compare the stored identifying information to the identifying information collected by the manufacturer's user portal 115. Alternatively, the provisioning controller 120 or the DAMS user portal 115 may be integrated with a user's enterprise identification and authentication system, which will determine if the staff 109 are authorized to use the system 100. In various implementations, the provisioning controller 120 or the DAMS user portal 115 may apply roles to the successfully authenticated staff 109 to constrain their actions within the system 100. In some implementations, the provisioning controller 120 may allow access only if the two sets of identifying information match.

Similarly, the provisioning controller 120 is also communicatively connected to an installer user portal 116, which may be implemented, e.g., as a server or as an interface to the provisioning controller 120. In various implementations, the staff 132 of a device installer may use the installer user portal 116 to interface with the provisioning controller 120 (and thus the DAMS 110) and manage their device installation and provisioning activities. The provisioning controller 120 may authenticate the staff 132 before allowing the staff 132 and assign them roles before allowing the staff 132 to access the secure provisioning system 100 and perform authorized functions on the system.

Also similarly, the provisioning controller 120 is also communicatively connected to a regulator portal 117, which may be implemented, e.g., as a server or as an interface to the provisioning controller 120. In various implementations, a regulator 140, once authenticated by the provisioning controller 120, may use the regulator portal 117 to interface with the provisioning controller 120 and manage the review and approval of manufacturers 104, installers 130, devices 106, and/or the software/digital assets that are installed in the devices 106. The provisioning controller 120 may authenticate the regulator 140 before allowing the regulator 140 to access the secure provisioning system 100. In some implementations of the system 100, the regulator 140 and the regulator portal 117 are optional.

The provisioning controller 120 is further communicatively connected to the DAMS 110. In various implementations, the DAMS 110 may be implemented as a server, a device, or a system of secure appliances and/or servers. The DAMS 110 securely retrieves the public keys from the end entity devices to be provisioned, via the distributer appliances 108, 131, or other secure and authenticated connection, and securely supplies the digital certificates and related data that are installed in the devices 106. In addition, the DAMS 110 securely receives, via the distributor appliances 108, 131, status information about the provisioning, installation, functionality, etc. of the computerized devices 106 from the manufacturer 105 and the installer 130. In addition, the DAMS 110 may perform this provisioning at a single site or at multiple sites as shown in FIG. 1. As explained in more detail with respect to FIG. 2, the DAMS 110 may include the following main elements: a root certificate authority (CA), a policy generator, a CRL generator, a misbehavior authority, an intermediate CA, an enrollment CA, a linkage authority, a pseudonym CA, and a registration authority.

The DAMS 110 adds new functionality and improves upon the components and functionality described in the paper "A Secure Credential Management System for V2V Communications" by William Whyte et al., 2013 IEEE Vehicular Networking Conference, December 2013. In various implementations, the DAMS 110 includes multi-stage programming and flexible management, (e.g., allowing the inclusion of regulators 140). Various implementations of the DAMS 110 also enable the ability to allow a single DAMS 110 to provide different levels of provisioning to different subscribers. Various implementations of the DAMS 110 also enable the ability to allow subscribers to assign different digital certificate usages during a time period (e.g., per week) as well as different certificate loads (such as one week, instead of three years as in conventional systems). Various implementations of the DAMS 110 may also provide subscriber-specific URLs so that a specific manufacturer's computerized device 106 (e.g., an OEM's vehicles) can stay within the manufacturer's sphere (e.g., their URL shows their name).

As shown, the provisioning controller 120 is also communicatively connected to the distributor appliances 108, 131. In various implementations, a distributor appliance 108, 131 may be implemented as a standalone secure appliance installed at the company premises (as shown) or as a web or cloud service, among other things. In various implementations, the distributor appliance 108, 131 is realized as a trusted endpoint device that securely transmits and receives digital assets and other information to and from the DAMS 110 and the provisioning controller 120, preferably via dedicated, non-Internet communications channels. As shown, a distributor appliance 108, 131 also connects, either directly or indirectly, with a device 106a, 106b, in order to download digital assets to, and receive data from, the device 106a, 106b. In various implementations, the distributor appliance 108, 131 can be implemented as box including a server computer (e.g., having at least one processor and associated memory) with a hardware security module (HSM), a hardened operating system (OS), an internal firewall and an internal host intrusion detection/prevention system. The distributor appliance may be specifically designed to operate in untrusted environments yet still provide trusted and reliable operation. The distributor appliance has a secure communications channel(s) between itself and the secure provisioning controller 120 and the DAMS 110. This channel is used to control the distributor appliance and to send and retrieve provisioning-related data and log information. The distributor appliance also may have a secure communications channel to the tester 107 used to program or provision the device 106. This channel protects provisioning data and log data from being revealed or modified on the manufacturing location's communication network. The distributor appliance 108 may also establish a secure communications channel directly with the device 106 to be programmed so that the provisioning data cannot be compromised or modified by a third party (including a rogue tester 107). In various implementations, the distributor appliance may collect public keys and other data, such as microprocessor serial numbers, from the devices 106 it is to provision. It may send this information to the provisioning controller 120 and/or the DAMS 110. It may also accept data and commands and other information from the provisioning controller 120 and/or the DAMS 110 to program into the device 106. It may return its own log data and it may return data from the tester 107 to the provisioning controller 120 and/or the DAMS 110.

As shown with respect to the device manufacture 105, the distributor appliance 108 may be communicatively connected to a tester 107, (e.g., a computerized manufacturing apparatus, a product testing device, or the like), which is in turn connects to the device 106a that was produced by the manufacturer 105, such as an OBU device. The manufacturer 105 may include or be a factory that manufactures and/or supplies computerized devices 106a to the market. As one of many possible examples, the computerized device 106a may be an embedded Universal Integrated Circuit Card (eUICC), which is used in cellular modems for telecommunications, incorporated as part of an On Board Unit (OBU) that is later installed in a car, for communications between cars and transportation infrastructure devices. It could also be the V2V secure microprocessor installed in an OBU for communications with other vehicles and Road Side Units (RSU). These newly manufactured devices 106a must be properly provisioned with digital assets, for example, digital certificate(s) from the DAMS 110, in order to operate properly. The staff 109 of the manufacturer 105 may use the user portal 115 to interact with the provisioning controller 120 and manage the product provisioning activity by the DAMS 110.

As shown with respect to the installer 130, the distributor appliance 131 may alternatively be communicatively connected directly to the device 106b, while or after the device 106b is installed in its operating environment. The installer 130 may include or be a factory or shop that installs computerized devices 106b into their operating environment—for example, installs OBUs into cars. At installation, the computerized devices 106b must be further properly provisioned with digital assets, for example, additional digital certificate(s) from the DAMS 110, in order to operate properly. The staff 132 of the installer 130 may use the installer user portal 116 to interact with the provisioning controller 120 and manage the product provisioning activity by the DAMS 110.

In various implementations, the provisioning controller 120, the distributor appliances 108, 131, and the DAMS 110 may have secure, non-publicly accessible communications links or channels between them, and in various embodiments, all of the communication links shown in FIG. 1 may be secure, non-publicly accessible communication channels. In various implementations, these secure channels are encrypted and mutually authenticated to prevent unauthorized end points from communicating within this secure infrastructure. Multiple security mechanisms may be used to protect these communications channels so that if the outer layer is somehow compromised, the inner layer will remain secure. As an example, a mutually authenticate TLS tunnel may be used as the outer layer with the inner layer using another protocol such as a proprietary secure communications protocol. These secure connections between the infrastructure components comprising system 100 are used for protecting the sensitive communications between the components and ensuring their correct operation. Using these secure paths, the provisioning controller 120 and the DAMS 110 can send digital data between components without concern that it will be compromised or modified in transit. Command and control information may be also passed over these channels. For instance, the provisioning controller 120 can control to which distributor appliance 108, 131, certain digital assets and data are sent. It can also instruct the distributor appliances 108, 131 how to meter out this data to devices 106 on the manufacturing line that it is provisioning. Further, the distributor appliances 108, 131 can report information back to the provisioning controller 120 without concern that it will be compromised or modified in transit. For example, the secure provisioning controller 120 can program the distributor appliance 108, 131 to provision up to 10,000 devices with any type of digital asset—e.g., certificates, software, fuse contents, etc. The distributor appliance 108, 131 can count the devices it is provisioning and when it reaches its limit, it will report that to the provisioning controller 120. In various implementations, the devices (e.g., 108, 110, 131, 115, 116, 117) that are managed by the provisioning controller 120 include functionality that causes them to cease to operate if they do not regularly communicate with the provisioning controller 120; thus if they are stolen then they become useless. This functionality prevents lost/stolen devices from continuing to operate and to provision devices 106 as if they were still located in the proper manufacturing environment.

Continuing to refer to the example shown in FIG. 1, in operation the distributor appliance 108 located at the manufacturer 105 securely receives digital assets from the DAMS 110 and supplies them to the tester 107 for the device 106a. As each device 106a is manufactured by the manufacturer 105, the tester 107 communicates with the device 106a to get information from the device 106a, such as its unique identification number and status, and to download or otherwise install the digital assets into the device, such as digital certificates. The tester 107 may also supply information (e.g., provisioning status) from the device 106a to the distributor appliance 108, which securely communicates that information to the DAMS 110 and/or the provisioning controller 120. In some implementations, the tester 107 may include a software transportation layer security (TLS) agent that securely transports data between the distributor appliance 108 and the device 106a, which in effect creates a secure encrypted communication path between the DAMS 110 and the device 106a via the distributor appliance 108 and the tester 107, using an ephemeral key associated with each device 106a.

After it is initially provisioned, the manufacturer 105 ships the device 106a to the installer 130, which installs the device 106b. In various implementations, before initial provisioning, the device 106a is nonfunctional; and after initial provisioning by the manufacturer 105, the device 106a is not yet fully functional although it can partially function. In such implementations, the initial provisioning makes the device functional only to the extent needed for installation and further final provisioning, which is required to make it fully operational.

The installer 130 installs the device 106b into its operational environment, and a staff member 132 of the installer 130 notifies the provisioning controller 120 of that fact via the installer portal 116. This notification attests that the installation was properly completed and preferably includes information uniquely identifying the device 106b to the provisioning controller 120. In some implementations, the distributor appliance 131 may automatically notify the provisioning controller 120 after querying the device 106b for status and identification information. In various implementations wherein the installer 130 attests via the Installer portal 116 that he has properly installed the device 106b, this attestation may be logged/saved into the database 125 by the provisioning controller 120. The attestation may include specific test data related to each particular installed device 106b, such as a radio transmit power measurement or a verification of a GPS antenna location.

In response to the installation notification, the provisioning controller 120 verifies that (i) the device 106b is listed in its database 125 as a device that was legitimately manufactured by the manufacturer 105, (ii) the device 106b is listed in its database 125 as having been successfully initially provisioned by the manufacturer 105, and (iii) the installer 130 is listed in its database 125 as an authorized installer. If this verification is successful, the controller 120 directs the DAMS 110 to send the digital assets (e.g., Pseudonym Certificates (PCs)) and/or other information needed to operationally provision the device 106b, such that the device 106b can properly function as installed in its operating environment.

In various implementations, the regulator 140, via the regulator portal 117, interacts with the provisioning controller 120 to identify, verify, and manage installers 130 and/or manufacturers 105, such that unauthorized installers (e.g., hackers) cannot obtain authentic digital assets from the system 100. The staff members of the regulator 140 may be authenticated by the provisioning controller 120 and may have unique IDs with the system 100 so that their actions can be uniquely logged. In various implementations, the regulator 140 can use the regulator portal 117 to query the provisioning controller 120 to obtain copies and reports of information logged by the controller 120, such as attestation reports, installer actions, number and identity of manufactured devices 106a, number and identity of installed, fully provisioned devices 106b, and the like.

In various implementations, the installer 130 must be authenticated as authorized by the provisioning controller 120 in order to interact with the system 100. To become authorized, the installer 130 may, for example, have to execute the appropriate contractual documents stating they will properly install the devices 106b in the target environment (e.g., target vehicle or site or the like). The installer 130 may, for example, be required to attest to other contractual elements by the regulator 140. Preferably, each installer 130 has a unique ID within the system 100 such that their actions can be uniquely logged by the provisioning controller 120.

The described implementations of the system 100 and its functionality ensures that only devices 106 that have been manufactured by the manufacturer 105 and properly installed and tested by and authorized installers 130 are fully provisioned with the digital assets needed to make the devices 106 operational. The provisioning controller 120 produces extensive logs and reports for what actions are taken by whom at each stage in the provisioning process, providing a critical audit capability that has not existed with conventional systems.

One of ordinary skill will recognize that the components, processes, data, operations, and implementation details shown in FIG. 1 are examples presented for conciseness and clarity of explanation. Other components, processes, implementation details, and variations may be used without departing from the principles of the invention, as this example is not intended to be limiting and many variations are possible. For example, although only one manufacturer 105, only one installer 130 and only one regulator 140 are shown in FIG. 1, other implementations may have any number of each of these entities. For another example, although the DAMS 110 and provisioning controller 120 are shown as separate devices, other implementations may combine their functionality into a single device, e.g., a single server. As yet another example, the same may be done for the portals 115-117. For yet another example, the system 100 could additionally include an asset management appliance (AMA, not shown), as described in the incorporated-by-reference U.S. Provisional Application No. 62/421,852 filed on 14 Nov. 2016. In such an implementation, the AMA may be communicatively connected to the provisioning controller 120 and/or the distributor appliances 108, 131 and/or the DAMS 110. In various implementations, the AMA may include a user-friendly GUI and functionality that allows production coordinators to easily and efficiently manage product (e.g. device 106) configurations and builds, and that allows asset owners to easily and efficiently manage inventories of digital assets.

Figure 2:
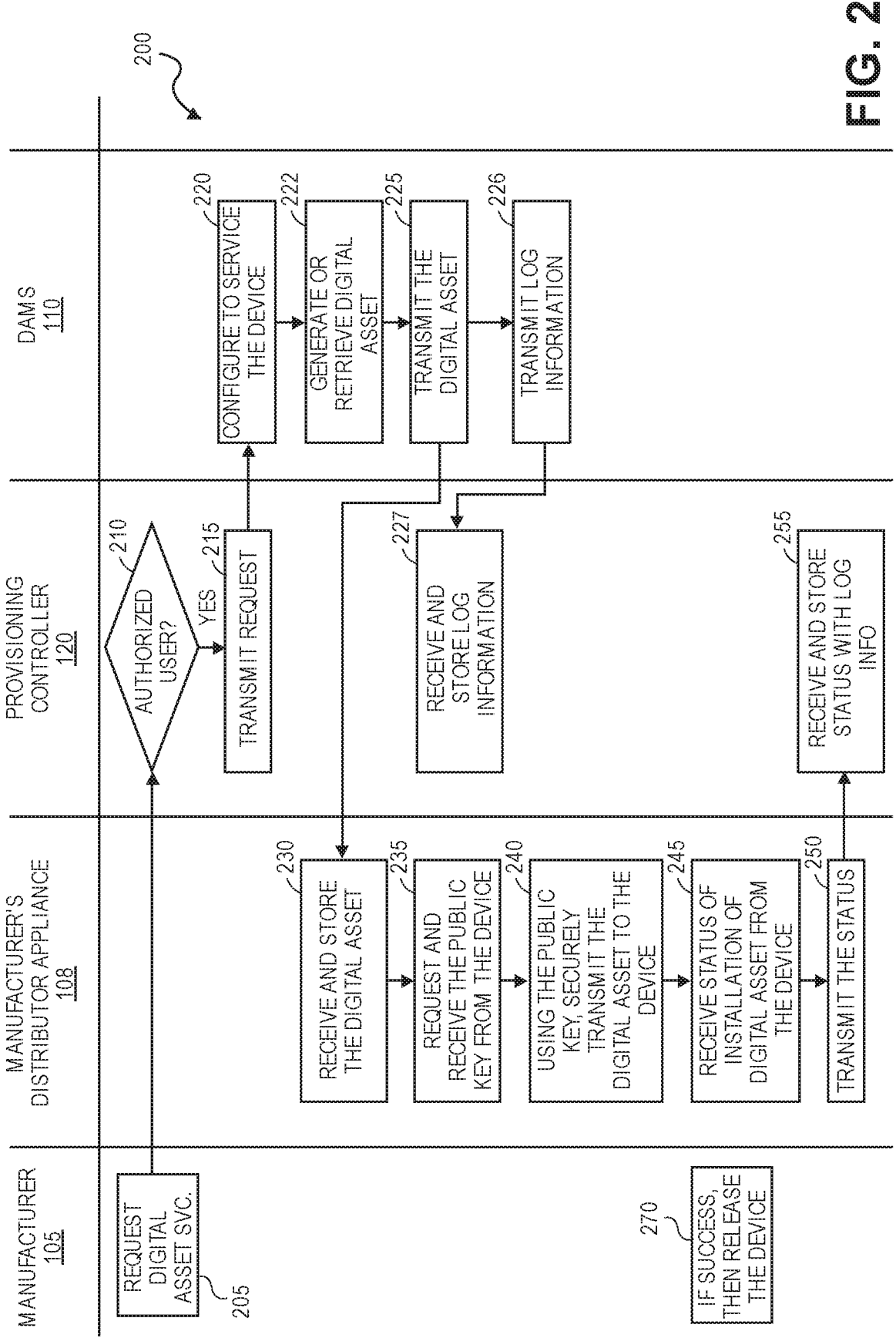
FIG. 2 is a swim-lane diagram illustrating an example of a process for securely provisioning a computerized device, consistent with implementations of the invention.

FIG. 2 is a swim-lane diagram illustrating an example of process 200 for securely provisioning a computerized device, consistent with implementations of the invention. In various implementations, some or all of the process 200 or the operations shown may be performed by code executing on a general purpose computing system (which may include one or more processors or one or more computing subsystems), by a hardware-only system, or by a system that is a hybrid of the two. As shown across the top of FIG. 2, the entities involved with the process 200 include the manufacturer 105 of the computerized devices 106, the distributor appliance 108 that is located at the manufacturer 105, the provisioning controller 120 and the DAMS 110. In various implementations, these entities may be, and may communicate with each other, as described with respect to FIG. 1 and throughout this disclosure.

As shown in the example of FIG. 2, the process 200 begins at 205 with the manufacturer 105 (e.g., a staff member 109) requesting digital asset provisioning service(s) from the provisioning controller 130, where the digital asset(s) will be provisioned to (e.g., used by) a device 106a and where the request may identify the device 106a that is the destination of the digital asset. The request may be, for example, a manufacturer 105 may be requesting provisioning service for a new product 106A or making a new provisioning service request for an existing product 106b. In various implementations, this operation may involve an authorized user logging onto the provisioning controller 130, for example, via the user portal 115. In some cases, the requested digital asset may be a secure credential such as an enrollment certificate; executable code that a device 106 will run; digital operating parameters; or the like. An enrollment certificate is a public key certificate that identifies its holder as an authorized participant in an ecosystem in which all participants must share valid enrollment certificates, (such as the USDOT's V2X ecosystem), and in which authorized participants are able to also receive pseudonym certificates that enable communication and operation of a device 106 within the ecosystem (e.g., to enable communications and operations between vehicles and roadside infrastructure in the example of the USDOT's V2X ecosystem).

At 210, the provisioning controller 120 determines whether the user from the manufacturer 109 is an authorized user. In some implementations, the provisioning controller 120 may also determine at 210 whether the device 106a (e.g., the product) to be provisioned is approved for use with the system 100. In some instances, a list of approved devices may be provided by the regulator 140 of FIG. 1 and used by the provisioning controller 120 to make this determination.

If the user (and/or the product) is not authorized, then the provisioning controller 120 rejects the request for the digital asset provisioning services (not shown in FIG. 2). If, on the other hand, an authorized user is making the request (e.g., for an authorized product) (210, Yes), then the provisioning controller 120 directs, instructs, or otherwise controls the DAMS 110 to fulfill the service request, for instance by transmitting a service request instruction (at 215) to the DAMS 110.

At 220, in response and upon condition of receiving the request from 215, the DAMS 110 configures itself to begin service to the device 106a, based on the request. In some implementations, the DAMS 110 may also send (not shown) instructions to the distributor appliance 108 to configure the distributor appliance 108 to service the device 106a.

At 222, the DAMS 110 generates, creates, calculates, and/or retrieves the digital asset for the device 106a, as requested at 205. In various implementations, the DAMS 110 may create or generate requested digital security asset(s), such as public and private key pairs as well as an enrollment certificate(s) and a pseudonym certificate(s) for the device 106a.

In an alternative implementation (not shown in FIG. 2) of operation 222, the DAMS 110 requests and receives, from the distributor appliance 108, digital-asset-generation information associated with the device 106a, such as enrollment and pseudonym public keys generated by and retrieved from the device 106a and data uniquely identifying the device 106a (e.g., a microprocessor serial number). In such implementations, the DAMS 110 then uses the enrollment and pseudonym public keys to generate the digital asset—e.g., the enrollment certificate and an appropriate number of pseudonym certificates for the device 106a.

At 225, the DAMS 110 transmits the digital asset to the distributor appliance 108 of the manufacturer 105 that requested the digital asset service at 205. For example, the DAMS 110 may securely transmit public and private key pairs, an enrollment certificate and pseudonym certificates to the distributor appliance 108 of the manufacturer 105.

At 226, the DAMS 110 transmits log information regarding the digital asset to the provisioning controller 120. In various implementations, the log information may include information describing the request and transfer of the digital asset, such as the requestor's ID, the digital asset's ID, the distributor appliance's ID, timestamps of the request and transmission actions, the received microprocessor serial number, etc. In some implementations, the log information may include a copy of the digital asset. At 227, the provisioning controller 120 receives and stores the log information, for example in the database 125. The provisioning controller 120, in effect, maintains an audit trail of all the activities that occur in the system 100, which allows many types of data to be assembled, such as data regarding how may devices 106a were built and provisioned by a manufacturer 105 and when. Such data and log information may be used for billing, as well as auditing purposes.

At 230, the distributor appliance 108 receives and stores the digital asset (e.g., public and private key pairs, an enrollment certificate and pseudonym certificates) that was sent by the DAMS 110.

At 235, the distributor appliance 108 requests and receives, from the device 106a, a digital security asset, such as a public key, that can be used to securely transfer the digital asset from the distributor appliance 108 to the device 106a. Various types of devices 106a have the ability to generate an ephemeral key pair, perhaps using a secure processor built into the devices 106, and the public key may be part of the ephemeral key pair. At 240, the distributor appliance 108 uses the digital security asset, (e.g., the public key), to securely transmit the digital asset (e.g., the enrollment certificate) to the device 106a. In various implementations, the distributor appliance 108 may use the device 106a's public key to form, for example, a virtual private network (VPN) with the device 106a and therein securely transmit the digital asset.

In various implementations, the distributor appliance 108 may employ transport layer security (TLS) between it and a tester 107 to secure communications with the tester 107, which may be connected to the device 106a. In implementations where it is desirable to have secure communication directly to the device 106a, the system may create an ephemeral public key pair on the device 106a and, using the public key along with a certificate from the distributor appliance 108 containing the distributor appliance 108's public key, create a secure tunnel to the device 106a. In such implementations, the device 106a would run special code with the system 100's root public key in it to validate the certificate that the distributor appliance 108 sends to it.

Once the secure path is established between the device 106a or the tester 107 and the distributor appliance 108, the device 106a can then create the enrollment and pseudonym public key pairs (e.g., for the V2X ecosystem) and export the public keys and other data to the distributor appliance 108, and the distributor appliance 108 can then send this data to the DAMS 110 and the provisioning controller 120. As described above with respect to the alternative implementation of operation 222, the DAMS 110 may use the received public keys to create the enrollment certificate and the pseudonym certificate(s)—in some implementations, there could be a large number (e.g., 3,000) of the pseudonym certificates. In this alternative example of an implementation, the DAMS 110 will return these certificate(s) to the distributor appliance 108 at operation 225 as previously described. In some other implementations, the DAMS 110 may transmit these certificates to the distributor appliance 131 instead of 108, depending on where the provisioning is being performed.

In some implementations, the distributor appliance 108 may communicate directly with the device 106, for example, if the device 106 has its own wireless or wired communication functionality and is at least partially operational. In other implementations, the distributor appliance 108 may communicate indirectly with the device 106 via an intermediate device, such as a tester 107.

The device 106a receives the digital asset and stores it for use during operation. For example, if the device 106a is an automobile on-board unit (OBU) or electronic control unit (ECU) and the digital asset is a security asset (e.g., a public key certificate) needed to join a wireless network, then the digital security asset is stored by the OBU. When the OBU is later installed and activated in a car, it will attempt to connect to a wireless network. The network will attempt to authenticate the OBU before allowing the OBU to connect to the network. The OBU will be able to authenticate and join the network only if it has the digital security asset provided by the distributor appliance 108 at the manufacturer 105.

At 245, the distributor appliance 108 receives or accesses, from the device 106a, status information that indicates whether or not the device 106a successfully received and installed (e.g., stored) the digital asset that was transmitted at 240.

At 250, the distributor appliance 108 transmits the status information to the provisioning controller 120. And at 255, the provisioning controller 120 receives and stores the status information in association with the log information stored in operation 227. Thus, the provisioning controller 120 continues the audit trail or audit log for all of the system 100 activities associated with each particular device 106. In various implementations, the audit log may contain, for each device 106, information indicating; the success of failure of the manufacturer's provisioning (e.g., operations 235-245); the identity of the digital asset (and/or a copy the digital asset itself); the type of cryptography; and the like.

At 270, if the device 106a was successfully provisioned with the digital asset, then the manufacturer 105 releases the device to the market. For example, the manufacturing company 105 may physically ship the device 106a to a company that installs the device in its operating environment (e.g., the installer company 130 of FIG. 1). In some implementations, the device 106a may be fully programmed or provisioned at this point in time, and able to operate with full functionality; while in other implementations, the device 106a may be only partially programmed or provisioned at this point, and is either unable to operate with full functionality or is nonfunctional.

The example depicted in FIG. 2 is only for the purpose of illustration and is not intended to be limiting. Further, the depicted process 200 is an example that has been somewhat simplified for clarity of explanation of certain novel and innovative features consistent with certain disclosed implementations, but this example is not intended to be limiting and many variations are possible. For example, while the functions and operations are shown as being performed in a particular order, the order described is merely an example, and various different sequences of operations can be performed, consistent with certain disclosed implementations. Moreover, the operations are described as discrete steps merely for the purpose of explanation, and, in some implementations, multiple operations may be performed simultaneously and/or as part of a single computation or larger operation. The operations described are not intended to be exhaustive, limiting, or absolute, and various operations can be modified, inserted, or removed. As an example of a variation, although FIG. 2 is generally described in the context of a single digital asset (e.g., a single digital certificate), the system and process will function similarly to handle multiple digital assets (e.g., two or more digital certificates). For another example, in a case where the device 106a does not have the secure communications ability, the operations 235 and 240 could be removed and the distributor appliance 108 could communicate with the device 106b using unencrypted communications.

For yet another example, in various implementations, the provisioning controller 120, or a delegated authority, such as a specialized signing appliance, may similarly transmit to the distributor appliance 108 and have it load another or an additional digital asset into the device 106b, including digital assets such as software, firmware, fuse blobs, manifest files, etc. In such implementations, the provisioning controller 120 may additionally or alternatively retrieve, obtain, or otherwise access, or direct the accessing of, a requested digital asset from storage. For example (not shown in FIG. 2), the provisioning controller 120, or its authorized delegate, may retrieve an executable software image (e.g., a compiled computer program stored in the database 125) that will be loaded into and run by a device 106a and send the executable software image to the distributor appliance 10 for programming into the device. In various implementations, the digital assets accessed by the provisioning controller 120 may consist only of software, etc., that was securely supplied, released, and/or authorized by the manufacturer 105 of the device 106a, such that no unauthorized software can be loaded into the device 106a. In some implementations, the digital assets retrieved by the provisioning controller 120 may be stored in a storage device or database that is associated with the provisioning controller 120, such as the database 125 of FIG. 1.

Figure 3:
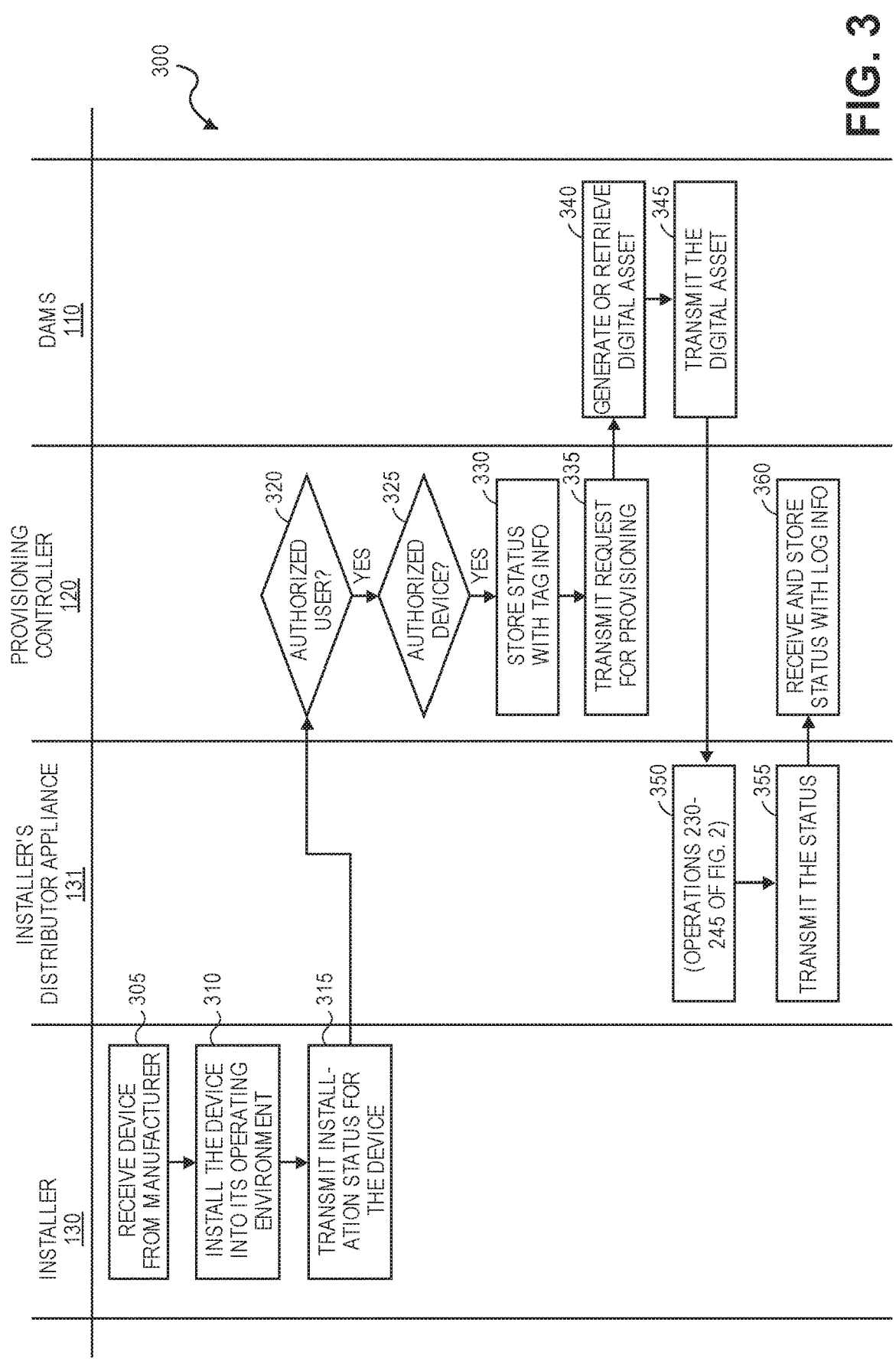
FIG. 3 is a swim-lane diagram illustrating another example of a process for securely provisioning a computerized device, consistent with implementations of the invention.

FIG. 3 a swim-lane diagram illustrating an example of process 200 for securely provisioning a computerized device, consistent with implementations of the invention. In various implementations, some or all of the process 300 or the operations shown may be performed by code executing on a general purpose computing system (which may include one or more processors or one or more computing subsystems), by a hardware-only system, or by a system that is a hybrid of the two. As shown across the top of FIG. 3, the entities involved with the process 300 include an installer 130 of the computerized devices 106, the distributor appliance 131 that is located at the installer 130, the provisioning controller 120 and the DAMS 110. In various implementations, these entities may be, and may communicate with each other, as described with respect to FIG. 1 and throughout this disclosure.

As shown in the example of FIG. 3, the process 300 begins at 305 with the installer 130 receiving a device 106b, (for example, an OBU or an ECU), that was manufactured and released or shipped by the manufacturer 105 (see operation 270 of FIG. 2). At 310, the installer 130 may install the device 106b into its operating environment, such as into a larger system. For example, the installer 130 may be an automaker that purchases OBUs from the manufacturer 105, and the installer 130 may install the OBU into a car. In various implementations, installing the device 106b may include testing the operation, functioning, etc. of the device 106b after installation, and collecting related status data.

In some implementations, the device 106b may be only partially provisioned and not fully functional. For example, the manufacturer 105 of the device 106b may have provisioned the device 106b with only the enrollment certificate, such that the device 106b would need to be further provisioned with another digital certification, such a pseudonym certificate in order to gain full functionality, for example, functionality to communicate with another fully programmed device 106.

At 315, the installer 130 (e.g., a staff member 132) transmits installation status data to the provisioning controller 120. In various implementations, the installation status data includes an immutable identifier of the device that was installed, e.g., a serial number or other fixed, uniquely identifying information, such as a public key from a key pair that is generated once and never erased. The installation status data may also include other information, such as a unique identifier of the installer 130, information indicating how and when the device 106b was installed, information about the results of tests done on the installed device 106b, information attesting that the installer 130 installed the device 106b in accordance with applicable specifications, contractual requirements, and or instructions, and/or other similar information.

At 320, the provisioning controller 120 determines whether the user from the installer 130 is an authorized user. If not, then the provisioning controller 120 rejects the installation status communication (not shown in FIG. 3). If, on the other hand, an authorized user is making the request (320, Yes), then the provisioning controller 120 determines (325) whether the device 106b that is identified in the installation status data is an authorized device. In some implementations, the provisioning controller 120 may determine that the device 106b is authorized by verifying against previously stored information its database 125 that 1) there is a record for the device 106b in its dbase 125; 2) the record indicates that the device 106b was successfully provisioned at the manufacturer 105; 3) that the record indicates that the device 106b was sent to the installer 130, (which was verified in 320 as being an authorized installer).

If the device identified in the installation status data is not authorized, then the provisioning controller 120 rejects the installation status communication (not shown in FIG. 3). If, on the other hand, the device 106b identified in the installation status data is authorized (325, Yes), then the provisioning controller 120 stores the installation status data with the log information associated with the device 106b, at 330. For example, the log information associated with the device 106b may have been previously stored in the database 125 as described with respect to operation 227 of FIG. 2.

At 335, the provisioning controller 120 directs, instructs, or otherwise controls the DAMS 110 to fulfill the provisioning request, for instance by transmitting, to the DAMS 110, a request to provision the device 106b, which is at the installer 130. At 340, in response and upon condition of receiving the request from 335, the DAMS 110 generates and/or retrieves the digital asset that was requested at 335. In various implementations, the DAMS 110 may create or generate the requested digital asset, such as a pseudonym certificate or other public key certificate, as described with respect to FIG. 2. In various implementations, the DAMS 110, or the provisioning controller 120 instead of the DAM 110, may additionally or alternatively retrieve, obtain, or otherwise access a requested digital asset from storage, such as an executable image previously stored in the database 125 for use in devices of device 106b's type.

At 345, the DAMS 110 transmits the digital asset to the distributor appliance 131 of the installer 130 that transmitted the installation status at 315. For example, the DAMS 110 may securely transmit a pseudonym certificate to the distributor appliance 131 of the installer 130.

At 350, the distributor appliance 131 performs operations the same as or similar to operations 230-245, as explained about with respect to FIG. 2. At 355, the distributor appliance 131 transmits the status information to the provisioning controller 120. And at 360, the provisioning controller 120 receives and stores the status information in association with previously stored information related to the device 106b, such as status information stored in operation 227. Thus, the provisioning controller 120 continues the audit trail or audit log for all of the system 100 activities associated with each particular device 106.

The process 300 depicted in FIG. 3 is an example for the purpose of illustration and is not intended to be limiting. Further, the depicted process 300 is an example that has been somewhat simplified for clarity of explanation of certain novel and innovative features consistent with certain disclosed implementations, but many variations are possible. For example, while the functions and operations are shown as being performed in a particular order, the order described is merely an example, and various different sequences of operations can be performed, consistent with certain disclosed implementations. Moreover, the operations are described as discrete steps merely for the purpose of explanation, and, in some implementations, multiple operations may be performed simultaneously and/or as part of a single computation or larger operation. The operations described are not intended to be exhaustive, limiting, or absolute, and various operations can be modified, inserted, or removed.

Figure 4A:
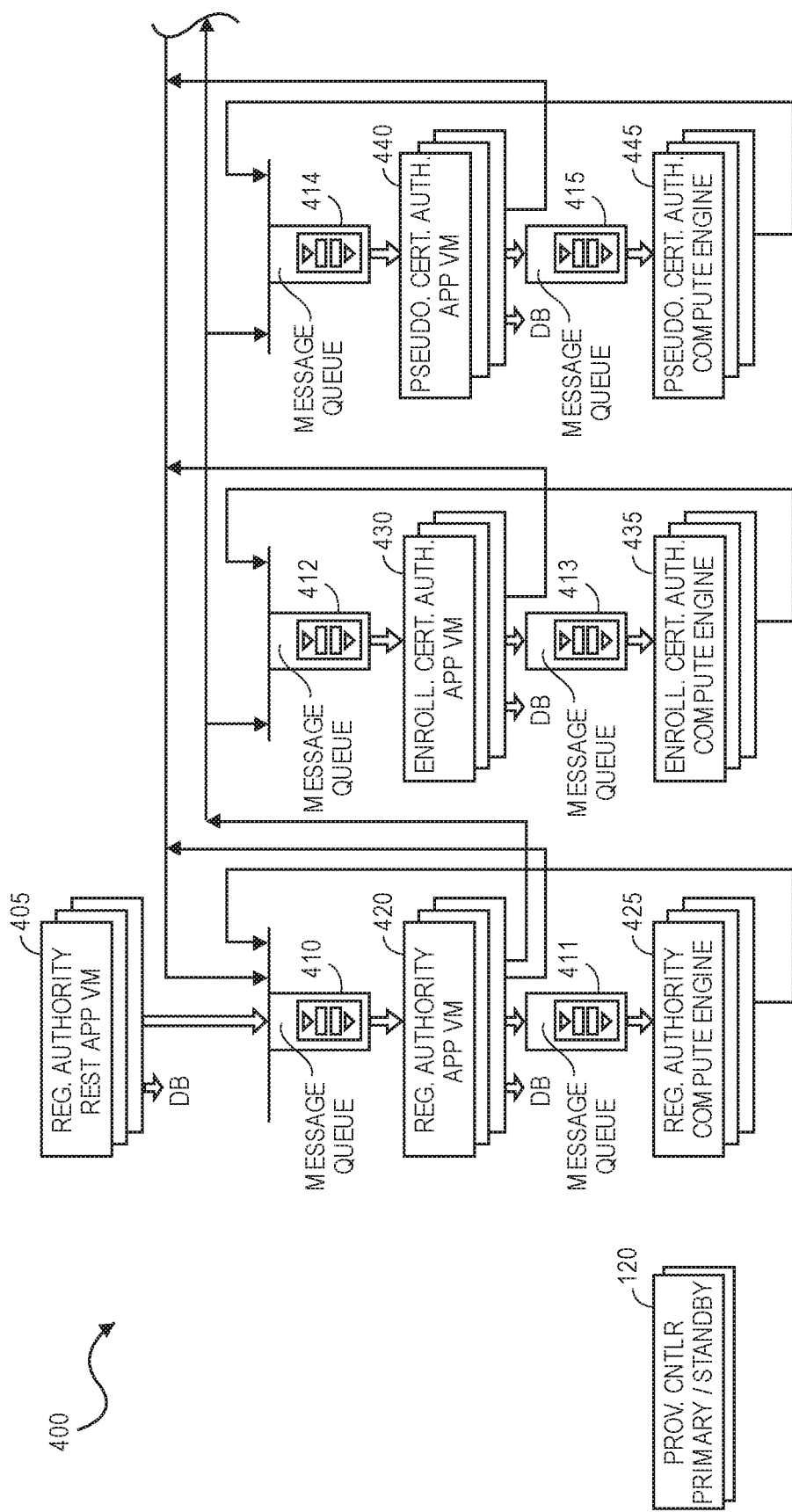
FIG. 4A is the first part of a block diagram of an example of a system for implementing a scalable and secure digital asset management system with message queues, consistent with implementations of the invention.
Figure 4B:
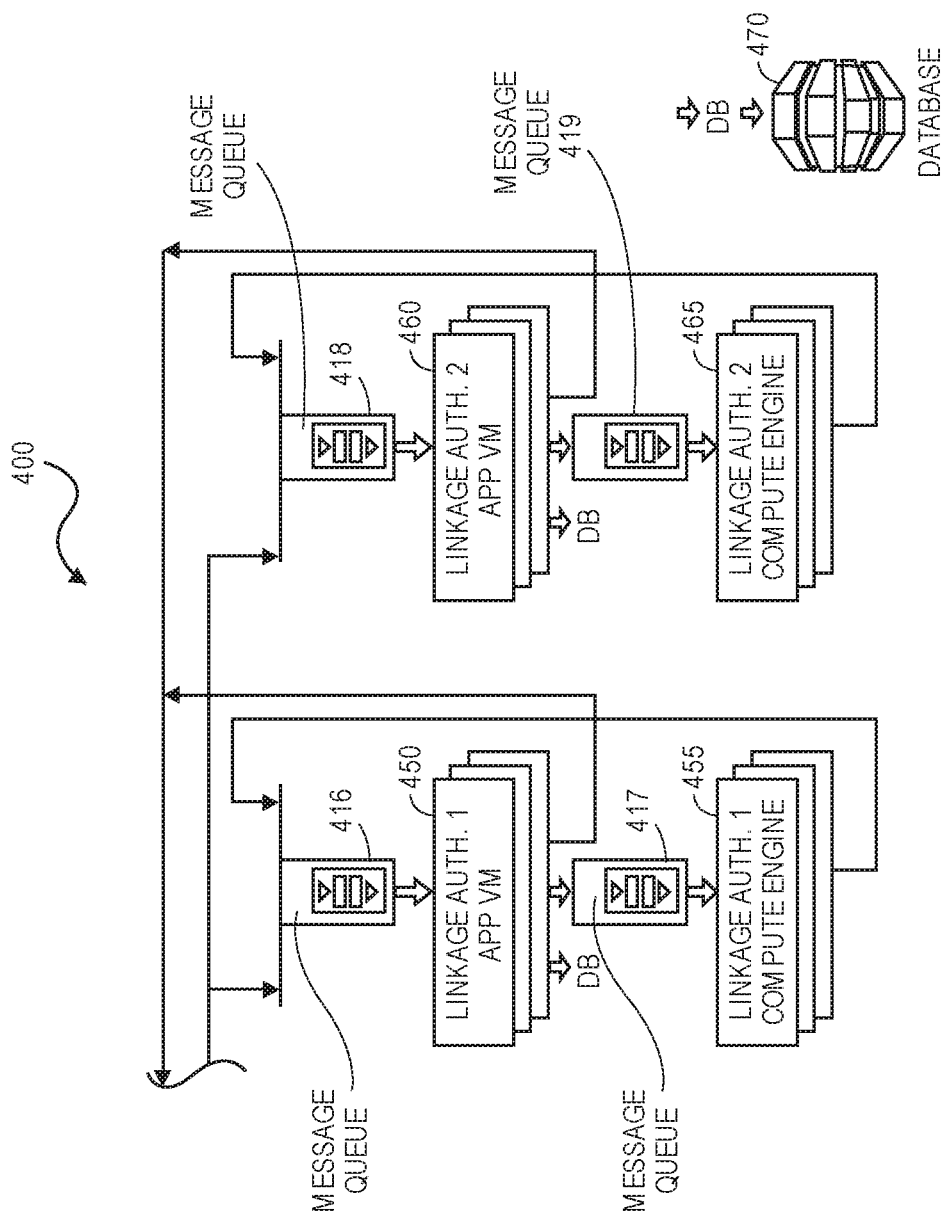
FIG. 4B is the second part of a block diagram of an example of a system for implementing a scalable and secure certificate management system with message queues, consistent with implementations of the invention.

FIGS. 4A and 4B are together a block diagram of an example architecture for implementing a scalable and secure certificate management system (CMS) 400, in accordance with implementations of the invention. Various implementations of the scalable CMS 400 may be used for extremely high volume device transaction and certificate generation processing. In various implementations, the scalable CMS 400 may be implemented using multiple servers, HSMs, multiple compute or computing engines, and multiple application platforms. In the example implementation shown in FIGS. 4A and 4B, the application platforms may each include one or more virtual machines (VMs). In additional or alternative implementations, the application platforms may each include one or more hardware platforms, such as, for example, application servers, computers, or other computer hardware capable of hosting and executing a software application. In the example of FIGS. 4A and 4B, the application platform for an enrollment certificate authority 430 may be one or more VMs that run an enrollment certificate authority application, the application platform for a pseudonym certificate authority 440 may be one or more VMs operable to host and run a pseudonym certificate authority application. Similarly, the application platform for a linkage authority 1 450 may be one or more VMs configured to host and run a linkage authority 1 application, and the application platform for a linkage authority 2 460 may be one or more VMs operable to host and run a linkage authority 2 application. Examples of the scalable CMS 400 may be implemented in a private data center, a cloud data center such as Amazon web services (AWS) from Amazon, or in a hybrid of private and cloud data centers.

In some implementations, the scalable CMS 400 may provide security certificates such as, for example, enrollment certificates and pseudonym certificates, to be used by the distributor appliance 108 of the manufacturer 105, which may function as described with respect to FIG. 1 and the other sections of this disclosure. In certain implementations, the scalable CMS 400 may interact with the digital asset management system (DAMS) 110 described above with respect to FIG. 1 in order to provide certificates to the distributor appliance 108.

As shown in the example of FIG. 4A, the architecture of the CMS 400 may include two provisioning controllers 120—a primary and a standby, which preferably are implemented in separate servers. The two provisioning controllers 120 include functionality such that objects, data, etc. contained in the primary provisioning controller are copied or otherwise contained in the standby (secondary) provisioning controller. The standby provisioning controller may be brought online to replace the primary provisioning controller if the primary provisioning controller goes offline for any reason. This provides continuous (or very high) availability of the provisioning controllers 120. In various implementations, the primary and a standby provisioning controllers may be as described with respect to FIG. 1 and the other sections of this disclosure. In various implementations, the provisioning controllers 120 may connect to the scalable CMS 400 in the same or similar manner as described herein with respect to the connections and communication between the provisioning controller 120 and the manufacturer's distributor appliance 108 of FIG. 1.

In general, the provisioning controllers 120 manage the system elements comprising the infrastructure so that only explicitly authorized elements can participate and interact with the scalable CMS 400. In various implementations, the provisioning controllers 120 may integrate with a user's (e.g., manufacturer 105 or installer 130) employee identification and authorization system, or it may provide its own capabilities for identification and authorization so that only authorized users can use the scalable CMS 400. In some implementations, the provisioning controllers 120 may be device lifecycle management (DLM) controllers, e.g., a primary and standby DLM controller. In various implementations, the provisioning controllers 120 may be controllers that are present in the CMS 400 per-type of component. For example, in FIGS. 4A and 4B, the provisioning controllers 120 may be a set or pair of controllers that are present for a registration authority 420, the enrollment certificate authority 430, the pseudonym certificate authority 440, and linkage authorities 450, 460.

As illustrated in FIGS. 4A and 4B, the architecture of the scalable CMS 400 includes a registration authority 405 implemented as a representational state transfer (REST) web service, a registration authority 420, a registration authority compute engine 425, the enrollment certificate authority 430, an enrollment certificate authority compute engine 435, the pseudonym certificate authority 440, a pseudonym certificate authority compute engine 445, a linkage authority 1 450, a linkage authority 1 compute engine 455, a linkage authority 2 460, a linkage authority 1 compute engine 465, message queues 410, 411, 412, 413, 414, 415, 416, 417, 418, 419, and one or more databases 470. Each of these components are described in the following paragraphs.

The architecture of the scalable CMS 400 advantageously separates the non-security-related applications from the security functions. As shown in the example of FIGS. 4A and 4B, the registration authority 420, the enrollment certificate authority 430, the pseudonym certificate authority 440, and the linkage authorities 450, 460 are implemented as applications on their own VMs, which execute on their own dedicated compute engines 425, 435, 445, 455, and 465, all of which are separate from any non-security-related applications and functions. This provides both a technical and security advantage and improvement over conventional systems, in which the performance of the HSMs is slow or in which the cloud service provider cannot supply HSMs or in which their proper management of the HSMs is uncertain. In the scalable CMS 400, all cryptographic operations that require an HSM are performed in a compute engine (e.g., one or more of compute engines 425, 435, 445, 455, and 465).

By separating the critical security functions from each other and onto separate compute engines, as shown in FIGS. 4A and 4B, the computation-intensive crypto and security functions (e.g., an elliptic curve butterfly expansion computation or an elliptic curve digital signature), for instance, as performed by the registration authority 420, the enrollment certificate authority 430, the pseudonym certificate authority 440, and the linkage authorities 450, 460, are performed significantly faster than existing registration authority systems. This design enables significant improvements in transaction processing by enabling the "bottleneck" applications to be individually scaled as needed. As such, implementations consistent with the present disclosure provide a particular, technically advantageous system architecture to reduce bottlenecks associated with existing registration authority systems. For instance, if the registration authority application running on registration authorities 405 and 420 needs to scale, additional VMs can be added while no change may be required in the secure compute capability of the registration authority compute engine(s) 425. Alternatively, if the security computations are limiting performance, additional secure registration authority compute engines 425 can be added. This same multi-dimensional scaling is true for the other components of the CMS 400. These capabilities provides significant performance improvements and scalability over existing Security Credential Management Systems (SCMS).

In the example shown in FIGS. 4A and 4B, the registration authority 405 is connected to the other components, and the other components are connected to each other, by a messaging subsystem or message queuing service, which includes the input message queues 410, 411, 412, 413, 414, 415, 416, 417, 418, and 419. In the example implementation of FIGS. 4A and 4B the input message queues 410, 411, 412, 413, 414, 415, 416, 417, 418, and 419 are unidirectional in that the messages in these queues flow one direction (e.g., from a client to a server). This provides the technical benefit of simplicity by having a single input queue for each of the VMs and compute engines.

In some implementations, the messaging service may be a fast message queuing service, such as, for example, the Amazon simple queue service (SQS) offered by Amazon web services. For instance, according to such implementations, the message queues 410, 411, 412, 413, 414, 415, 416, 417, 418, and 419 may be SQS message queues. By using input message queues 410, 411, 412, 413, 414, 415, 416, 417, 418, 419 to communicatively connect the application VMs and the compute engines to each other, the application VMs and compute engines can be independently scaled as needed. That is, since the respective application platforms for the registration authority 420, the enrollment certificate authority 430, the pseudonym certificate authority 440, and the linkage authorities 450, 460 are communicatively connected to compute engines 425, 435, 445, 455, and 465 via respective sets of input message queues, these components of the CMS 400, as well as the database(s) 470, all scale independently from each other.

As noted above and shown in the non-limiting example of FIGS. 4A and 4B, each of the registration authorities 405, 420, the certificate authorities 430, 440, and the linkage authorities 450, 460 may be implemented as applications on their own virtual machines (VMs). In additional or alternative implementations, one or more of the registration authorities 405, 420, the certificate authorities 430, 440, and the linkage authorities 450, 460 may execute on hardware platforms (e.g., servers or compute engines). The roles and functionalities of each of these applications executing on application platforms (e.g., VMs or hardware platforms) are described in the following paragraphs.

In various implementations, the registration authority 405 may be the authority in a provisioning network that verifies user requests for a digital certificate, or other type of digital security asset, and enable a certificate authority, (e.g., the enrollment certificate authority 430 and the pseudonym certificate authority 440) to issue the digital certificate. In various implementations, the registration authority 405 may be similar to the registration authorities known in the public key infrastructure (PKI) system. In various implementations, the registration authority 405 may be implemented as a representational state transfer (REST) web service. As represented by the three "stacked" rectangles shown in FIG. 4A for the registration authority 405, in various implementations there may be multiple instances of the registration authority 405 executing at the same time. This is similarly represented for the other "stacked" elements of FIGS. 4A and 4B. The registration authority functionality of the CMS 400 is non-centralized in that its functionality can be carried out by multiple instances of registration authority 405 implemented as a REST web service and multiple instances of the registration authority 420. A primary role for the registration authorities 405, 420 is to grant and fulfill certificate provisioning requests while keeping the signing pseudonym certificate authority 440 from knowing which certificates end up in a particular computerized device. The registration authorities 405, 420 interact directly with the pseudonym certificate authority 440, the linkage authorities 450, 460 via the message queues 414, 416, and 418 in order to fulfill their roles within the CMS 400.

As represented by the "DB" arrow emerging at the lower left of the rectangles, the registration authority 405 (and the other components of FIGS. 4A and 4B shown with "DB" arrows) may be connected to a respective database 470. Although only a single database 470 is shown in FIG. 4A, it is to be understood that the CMS 400 may utilize a collection of data stores or databases 470 for data storage and retrieval. For example, the database 470 may consist of one or more database logical or physical units, each with one or more tables enabling data separation where required. As used herein, the term "database" refers to one or more databases or data stores. In certain implementations, the use of multiple databases 470 allows for data separation between the registration authority 405 other components of FIGS. 4A and 4B shown with "DB" arrows. For example, such use of multiple databases 470 allows for data separation between the registration authorities 405, 420, the certificate authorities 430, 440, and the linkage authorities 450, 460.

In preferred implementations, the database(s) 470 are a collection of one or more fast access, low-latency databases. In some implementations, the database(s) 470 may be a NoSQL database or database service, such as, for example, the DynamoDB data service offered by Amazon web services. In various implementations, the data stored in the database 470 is application dependent, but may include past issued certificates, various linkage authority values, data on devices to whom certificates have been issued, operator actions, etc. Note that the data may be stored either unencrypted, encrypted, or some combination thereof.

In various implementations, the scalable CMS 400 includes an enrollment certificate authority 430 and a pseudonym certificate authority 440, as the digital certificates produced by the registration authority 405 are split into different segments—e.g., an enrollment digital certificate and pseudonym digital certificates.

The enrollment certificate authority 430 is a non-central component of the CMS 400 as there may be multiple instances of the enrollment certificate authority 430 executing at the same time. As illustrated by the three "stacked" rectangles in FIG. 4A for the enrollment certificate authority 430, in some implementations there may be multiple instances of the enrollment certificate authority 430 executing simultaneously. The enrollment certificate authority 430 may receive requests for enrollment certificates from the registration authority 420. A primary role of the enrollment certificate authority 430 is to fulfill requests from the registration authority 420 to issue enrollment certificates to end-user devices, such as, for example, the distributor appliance 108 of manufacturer 105 shown in FIG. 1. As described below with reference to FIG. 5A, the enrollment certificate authority 430 interacts directly with the registration authority 420 in order to fulfill its role within the CMS 400.

The pseudonym certificate authority 440 is a non-central component of the CMS 400 in that there may be multiple instances of the pseudonym certificate authority 440 executing simultaneously. Again, as depicted by the three "stacked" rectangles in FIG. 4A for the pseudonym certificate authority 440, in various implementations, there may be multiple instances of the pseudonym certificate authority 440 executing in parallel at the same time. The pseudonym certificate authority 440 may receive requests for pseudonym certificates from the registration authority 420. A primary role of the pseudonym certificate authority 440 is to fulfill requests from the registration authority 420 to issue pseudonym certificates to end-user devices, such as, for example, the distributor appliance 108 of manufacturer 105 shown in FIG. 1. In certain implementations, the pseudonym certificate authority 440 fulfills requests for short-term pseudonym certificates for V2V functionality. As described below with reference to FIG. 5B, the pseudonym certificate authority 440 interacts directly with the registration authority 420 in order to fulfill its functions within the CMS 400.

In various implementations, the linkage authorities 450, 460 shown in FIG. 4B link the identity of the certificate requestor (i.e., a unique identifier of the certificate requestor's device), to an issued pseudonym certificate for revocation purposes. That is, the linkage authority 1 450 and linkage authority 2 460 provide respective linkage values as unique identifiers of the certificate requestor's device to the issued pseudonym certificate. The linkage authority 1 450 and linkage authority 2 460 may receive requests for linkage values from the registration authority 420, and then provide the requested linkage values to the registration authority 420. As described below with reference to FIG. 5A, the linkage authorities 450, 460 interact directly with the registration authority 420 in order to fulfill requests for linkage values.

In various implementations, the compute engines 425, 435, 445, 455, and 465 and the provisioning controller 120 include HSMs, which allow these components to perform secure computations without being unduly threatened from hackers. In some implementations, the compute engines 425, 435, 445, 455, and 465 may be designed to perform secure computations themselves without requiring an embedded HSM—in such implementations, they embody the HSM.

In various implementations, different HSM versions may be used in the CMS 400. For example, the HSMs may include embedded HSMs installed as plug-in cards within one or more of the compute engines 425, 435, 445, 455, and 465. In such example implementations, the embedded HSMs may be installed in one or more of the compute engines as Peripheral Component Interconnect (PCI) HSMs or PCI Express (PCIe) HSMs. Also, for instance, the HSMs in the CMS 400 may include external, network-attached or network-connected HSMs that are separate from compute engines in their own enclosures.

One of ordinary skill will recognize that the components, processes, data, operations, and implementation details shown in FIGS. 4A and 4B are examples presented for conciseness and clarity of explanation. Other components, processes, implementation details, and variations may be used without departing from the principles of the invention, as this example is not intended to be limiting and many variations are possible.

Figure 5A:
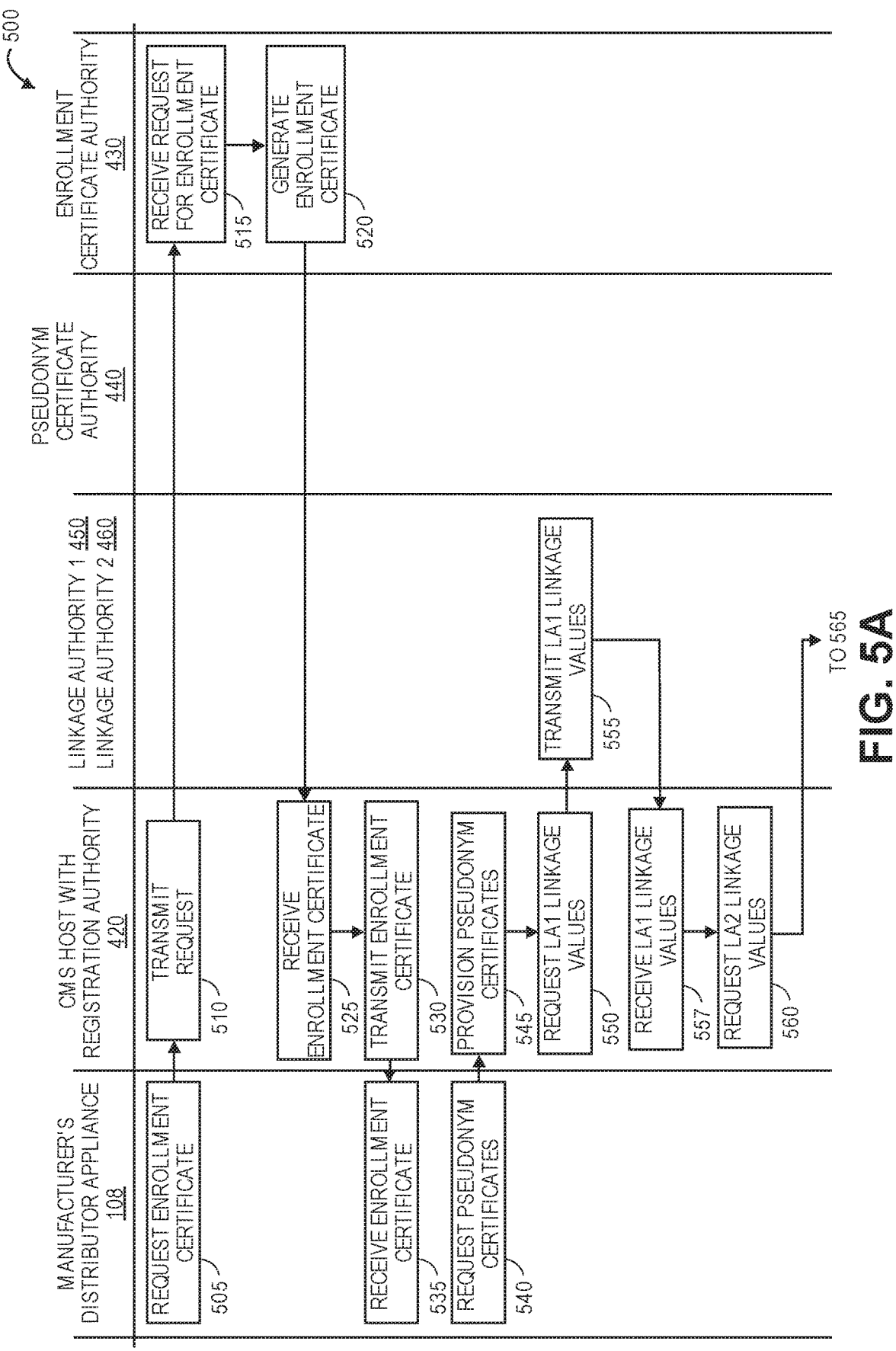
FIG. 5A is the first part of a is a swim-lane diagram illustrating an example of a process for securely providing credentials such as certificates, consistent with implementations of the invention.
Figure 5B:
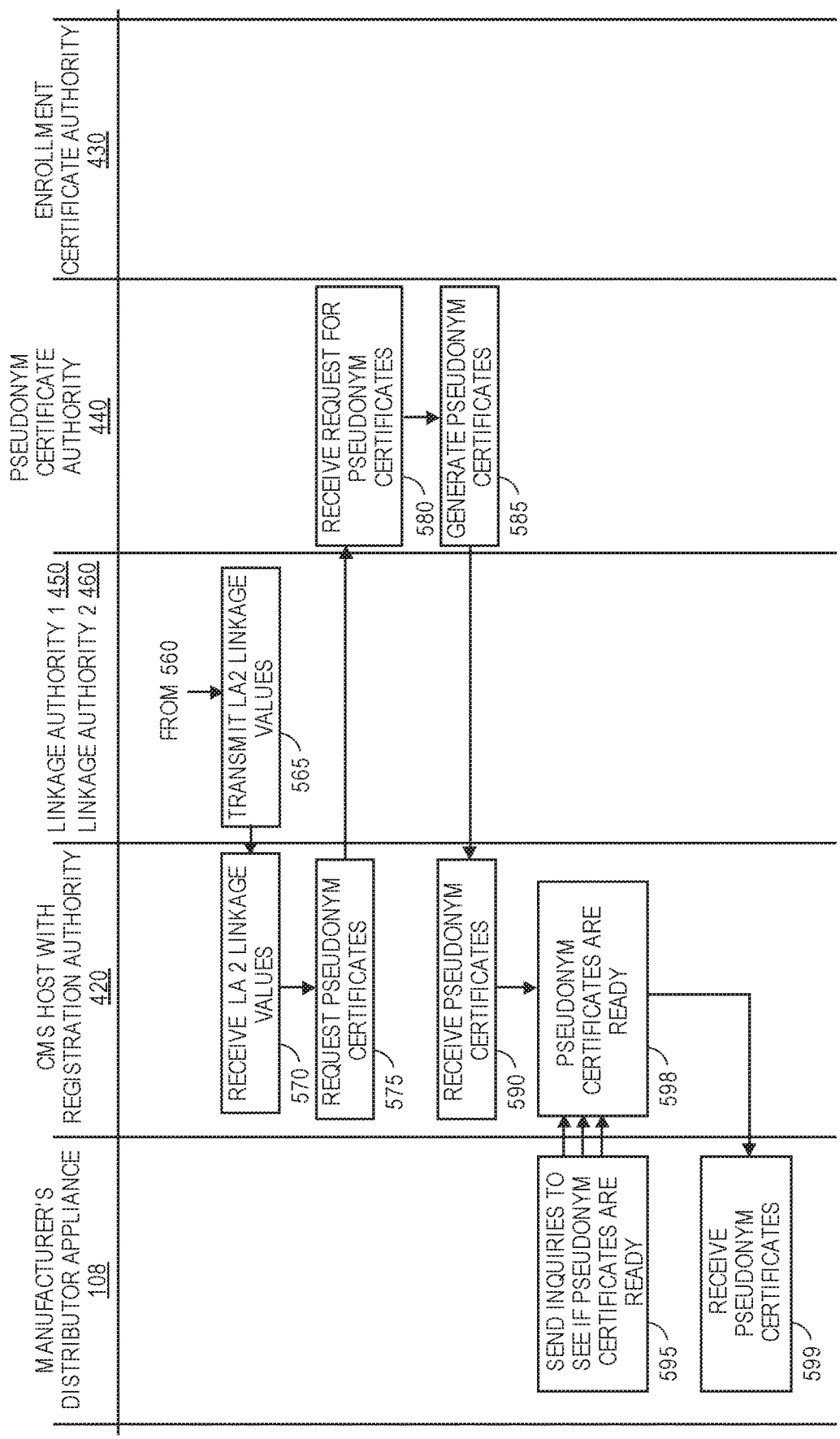
FIG. 5B is the second part of is a swim-lane diagram illustrating an example of process for securely providing credentials such as certificates, consistent with implementations of the invention.

FIGS. 5A and 5B are together a swim-lane diagram illustrating an example process 500 for securely providing credentials such as certificates, consistent with implementations of the invention. In various implementations, some or all of the process 500 or the operations shown may be performed by code executing on a general purpose computing system (which may include one or more processors or one or more computing subsystems), by a hardware-only system, or by a system that is a hybrid of the two. As shown across the top of FIGS. 5A and 5B, the entities involved with the process 500 include the distributor appliance 108 that is located at the manufacturer 105, the registration authority 420 of a CMS host, linkage authorities 450, 460, the pseudonym certificate authority 440, and the enrollment certificate authority 430. In various implementations, these entities may be, and may communicate with each other, as described with respect to FIGS. 4A and 4B and throughout this disclosure.

As shown in the example of FIG. 5A, the process 500 begins with enrollment-related operations 505-535. A primary role of the enrollment certificate authority 430 is to fulfill requests from the registration authority 420 to issue enrollment certificates to end-user devices, such as, for example, the distributor appliance 108. As described below with reference to enrollment-related operations 505-535, the enrollment certificate authority 430 interacts directly with the registration authority 420 in order to issue a requested enrollment certificate to distributor appliance 108.

At 505, the distributor appliance 108 of the manufacturer 105 requests an enrollment certificate from the registration authority 420, where the enrollment certificate will be provisioned to (e.g., used by) a device 106a and where the request may identify the device 106a that is the destination of the enrollment certificate. The request may be, for example, the distributor appliance 108 of manufacturer 105 that is requesting an enrollment certificate for a new device 106A (e.g., a new product). As noted with reference to FIG. 2 above, an enrollment certificate is a public key certificate that identifies its holder as an authorized participant in an ecosystem in which all participants must share valid enrollment certificates, (such as, for example, the USDOT's V2X ecosystem), and in which authorized participants are able to also receive pseudonym certificates that enable communication and operation of a device 106 within the ecosystem (e.g., to enable communications and operations between vehicles and roadside infrastructure in the example of the USDOT's V2X ecosystem).

At 510, the request for the enrollment certificate is received at the registration authority 420, and then transmitted from the registration authority 420 to the enrollment certificate authority 430. In various implementations, this operation may involve the registration authority 420 decrypting and verifying the request, including signature verification, checking for revocation status of the device that is the destination of the enrollment certificate (e.g., device 106a) using a list of unapproved devices (e.g., a blacklist), and determining whether the requestor (e.g., distributor appliance 108) is allowed to request enrollment certificates from the registration authority 420. For instance, operation 510 may include determining whether a user from the manufacturer 105 is an authorized user (e.g., part of staff 109). In some implementations, the registration authority 420 may also determine at 510 whether the device 106a (e.g., the product) to receive the enrollment certificate is approved for use with the system 100. In some instances, a list of approved devices (e.g., a whitelist) may be provided by the regulator 140 of FIG. 1 and used by the provisioning controller 120 to make this determination. After the request for the enrollment certificate is verified, the request is transmitted from the registration authority 420 to the enrollment certificate authority 430. This request may be sent as an enrollment certificate generation request that is created by the registration authority 420.

At 515, the request for the enrollment certificate is received at the enrollment certificate authority 430. In response to receiving the request, at 520, the enrollment certificate authority 430 generates the requested enrollment certificate and transmits the generated enrollment certificate back to the registration authority 420. At 525, the enrollment certificate is received at the registration authority 420, and at 530, the registration authority 420 transmits the enrollment certificate to the distributor appliance 108. At 535, the distributor appliance 108 receives the enrollment certificate. At this point, the distributor appliance 108 may provision the enrollment certificate to a device (e.g., device 106a) so that the device can use the enrollment certificate, and the enrollment-related operations are completed.

Operations 540-599 are related to provisioning pseudonym certificates. At 540, the distributor appliance 108 requests pseudonym certificates from the registration authority 420. The pseudonym certificates will be provisioned to (e.g., used by) a device 106a and the request may identify the device 106a that is the destination for the pseudonym certificates. The request may be, for example, the distributor appliance 108 of manufacturer 105 that is requesting pseudonym certificates for a computerized device that previously received an enrollment certificate (e.g., an enrolled device 106A). Pseudonym certificates include a certain amount (e.g., a week's worth, a month's worth, or a year's worth) of public key certificates.

At 545, the request for the pseudonym certificates is received at the registration authority 420, which then initiates provisioning of the pseudonym certificates.

At operations 550-570, the linkage authorities 450, 460 interact directly with the registration authority 420 in order to fulfill requests for linkage values. At 550, the registration authority 420 transmits a request for a first set of linkage values (LA1) to linkage authority 1 450.

At 555, in response to receiving the request for a first set of linkage values, the linkage authority 1 450 generates and transmits the first set of linkage values to the registration authority 420. At 557, the first set of linkage values are received at the registration authority 420. At 560, the registration authority 420 transmits a request for a second set of linkage values (LA2) to linkage authority 2 460.

Next, as shown in FIG. 5B, at 565, in response to receiving the request for a second set of linkage values, the linkage authority 2 460 generates and transmits the second set of linkage values to the registration authority 420. At 570, the second set of linkage values are received at the registration authority 420.

In certain implementations, the linkage authorities 450, 460 shown in FIGS. 5A and 5B can link the identity of the certificate requestor (i.e., a unique identifier of the certificate requestor's device), to an issued pseudonym certificate for revocation purposes. That is, the linkage authority 1 450 and linkage authority 2 460 respectively provide the first and second set linkage values as unique identifiers of the certificate requestor's device to a pseudonym certificate issued by the pseudonym certificate authority 440 as part of process 500. The linkage authority 1 450 and linkage authority 2 460 receive requests for linkage values sent from the registration authority 420 at operations 550 and 560, and then provide the requested linkage values to the registration authority 420 at operations 555 and 565.

In non-limiting example implementations, the requests for linkage values and responses to the requests exchanged in operations 550-570 may include messages with the header and payload data items as shown below:

```
# Registration Authority (RA)-> Linkage Authority-x (LA-x): Initial Linkage Seed
Request {
header: {
    msgID: mt.MSG_RA_LA_LINKAGE_SEED_REQUEST_MSG,
    taskPosition: "Linkage Authority number 1 or 2"
},
payload: {
    identifier: "Message identifier",
    iMin: Number,
    iMax: Number,
    jMax: Number
    }
}
# LA-x -> RA: Initial Linkage Seed Response {
    header: {
    msgID: mt.MSG_LA_RA_LINKAGE_SEED_RESPONSE_MSG,
        taskPosition: "Linkage Authority number 1 or 2"
    },
    payload: {
        identifier: "Incoming Message identifier",
        linkageChainIdentifier: "Linkage Chain ID -- HashedId8 of AES CCM
    Encrypted Linkage Seed",
        iMin: Number,
        iMax: Number,
        jMax: Number
    }
}
# RA -> LA-x: PreLinkage Value Chain Request (Chunked 10 iRange at a time) {
    header: {
```

```
            msgID: mt.MSG_RA_LA_PRE_LINKAGE_VALUE_REQUEST_MSG,
            iRangeSegmentChunkSize: "set to 10",
            currentIRangeSegment: "Index of segment in total request",
            taskPosition: "Linkage Authority number 1 or 2"
        },
        payload: {
            identifier: "Incoming Message identifier",
            linkageChainId: "Linkage Chain ID to use to create P Linkage Values (PLVs)",
            iMin: Number,
            iMax: Number,
            jMax: Number
        }
    }
# LA-x -> RA: PreLinkage Value Chain Response {
    header: {
        msgID: mt.MSG_LA_RA_PRE_LINKAGE_VALUE_RESPONSE_MSG,
        iRangeSegmentChunkSize: "set to 10",
        currentIRangeSegment: "Index of segment in total request",
        taskPosition: "Linkage Authority number 1 or 2"
    },
    payload: {
        identifier: "Incoming Message identifier",
        preLinkageValues: Array of Encryped Prelinkage values for this segment of i,j tuples,
        linkageChainIdentifier: "Linkage Chain ID to use to create P Linkage Values (PLVs)",
        iMin: Number,
        iMax: Number,
        jMax: Number
    }
}
```

With continued reference to FIG. 5B, at 575, the registration authority 420 transmits a request for the pseudonym certificates to the pseudonym certificates authority 430. This request may be sent as a batch of pseudonym certificate generation requests that are created by the registration authority 420.

At 580, the request for the pseudonym certificates is received at the pseudonym certificates authority 430. In response to receiving the request, at 585, the pseudonym certificates authority 430 generates the requested pseudonym certificates and transmits the generated pseudonym certificates back to the registration authority 420. At 590, the pseudonym certificates are received at the registration authority 420.

At 595, the distributor appliance 108 may send multiple requests to the registration authority 420 to inquire as to whether the requested pseudonym certificates are ready (i.e., generated and available) or not. In certain implementations, the inquiries of operation 595 may be sent any time after the request for pseudonym certificate is sent at operation 540. For example, after sending the request for pseudonym certificates to the registration authority 420 at operation 540, the distributor appliance 108 may then periodically send inquiries to the registration authority 420 to determine if the requested pseudonym certificates are ready. In this example, one or more of the inquiries of operation 595 may be sent in parallel with operations 545-590 (i.e., while the pseudonym certificates are being generated).

At 598, when the pseudonym certificates are ready, the registration authority 420 transmits the pseudonym certificates to the distributor appliance 108. At 599, the distributor appliance 108 receives the pseudonym certificates. At this point, the distributor appliance 108 may provision the pseudonym certificates to a device (e.g., device 106*a*) so that the device can use the pseudonym certificates, and the operations for provisioning the pseudonym certificates are completed.

In certain non-limiting example implementations, the requests for pseudonym certificates and responses to the requests exchanged in operations 575-590 may include messages with the header and payload data items as shown below:

```
# Registration Authority (RA) -> Pseudonym Certificate Authority (PCA): Generate an
individual Certificate {
    header: {
        msgID: mt.MSG_RA_PCA_CERT_REQUEST_MSG,
        iRangeSegmentChunkSize: "set to 10"
    },
    payload: {
        identifier: "hash of payload minus this field"
        i: Number,
        plv1: "Encrypted PLV from LA1",
        plv2: "Encrypted PLV from LA2",
        seedPublicKey: "Seed Verify Public key",
        encryptKey: "Seed Encrypt Public key",
        startSeconds: "start time for this certificate",
        endSeconds: "end time for this certificate",
        region: "requested region",
        certRequestPermissions: "the cert request permissions from the enrollment cert (will
    be turned into app permissions)"
```

```
    }
}
#PCA -> RA: Certificate Response
{
    header: {
        msgID: mt.MSG_PCA_RA_IDENTITY_CERT_RESPONSE_MSG
    },
    payload: {
        data: "Signed and Encrypted SCMS certificate response",
        identifier: "hash of original payload request"
    }
}
```

Figure 6A:
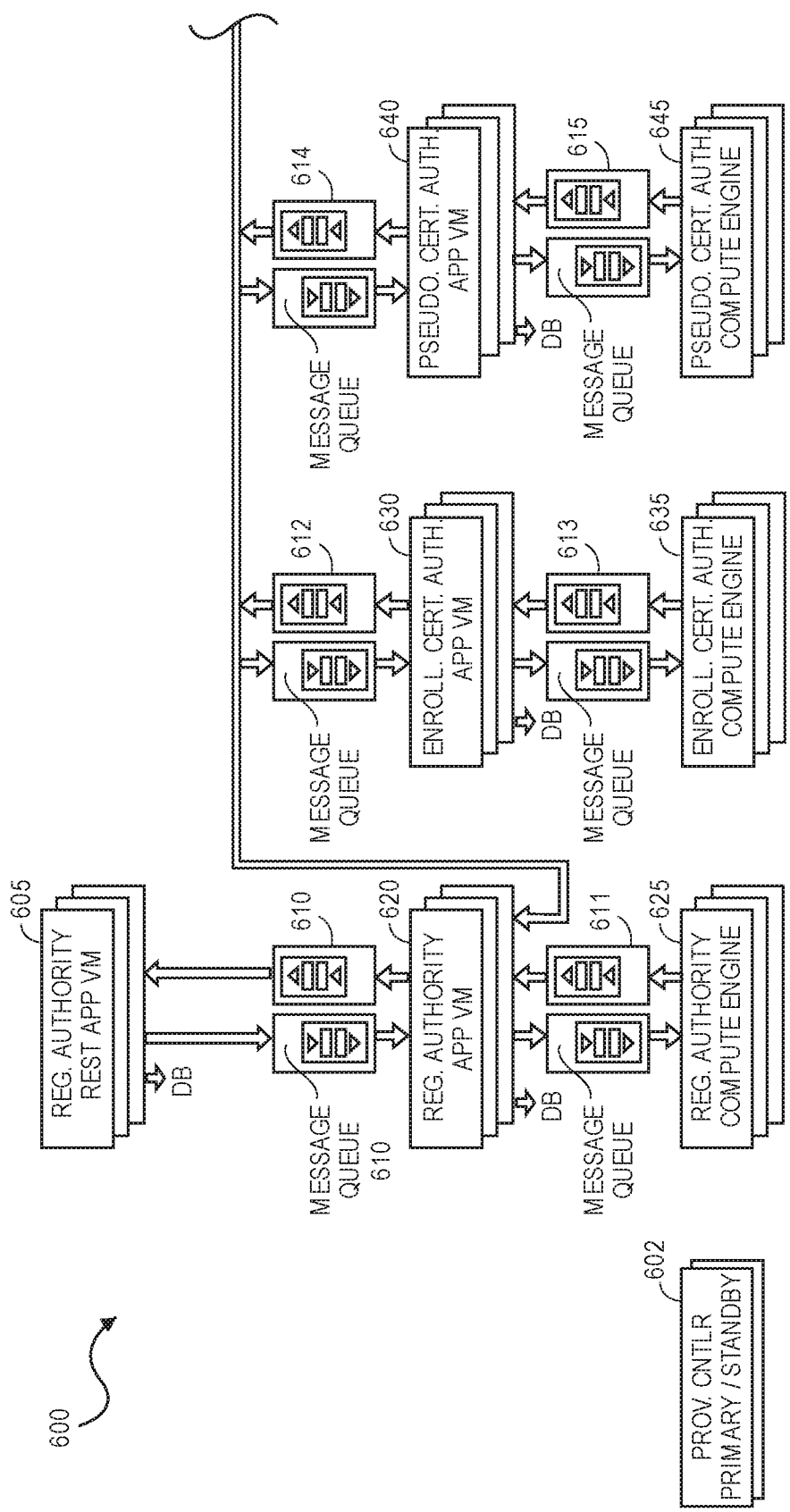
FIG. 6A is the first part of a block diagram of an example of a system for implementing a scalable and secure certificate management system with bidirectional message queues, consistent with implementations of the invention.
Figure 6B:
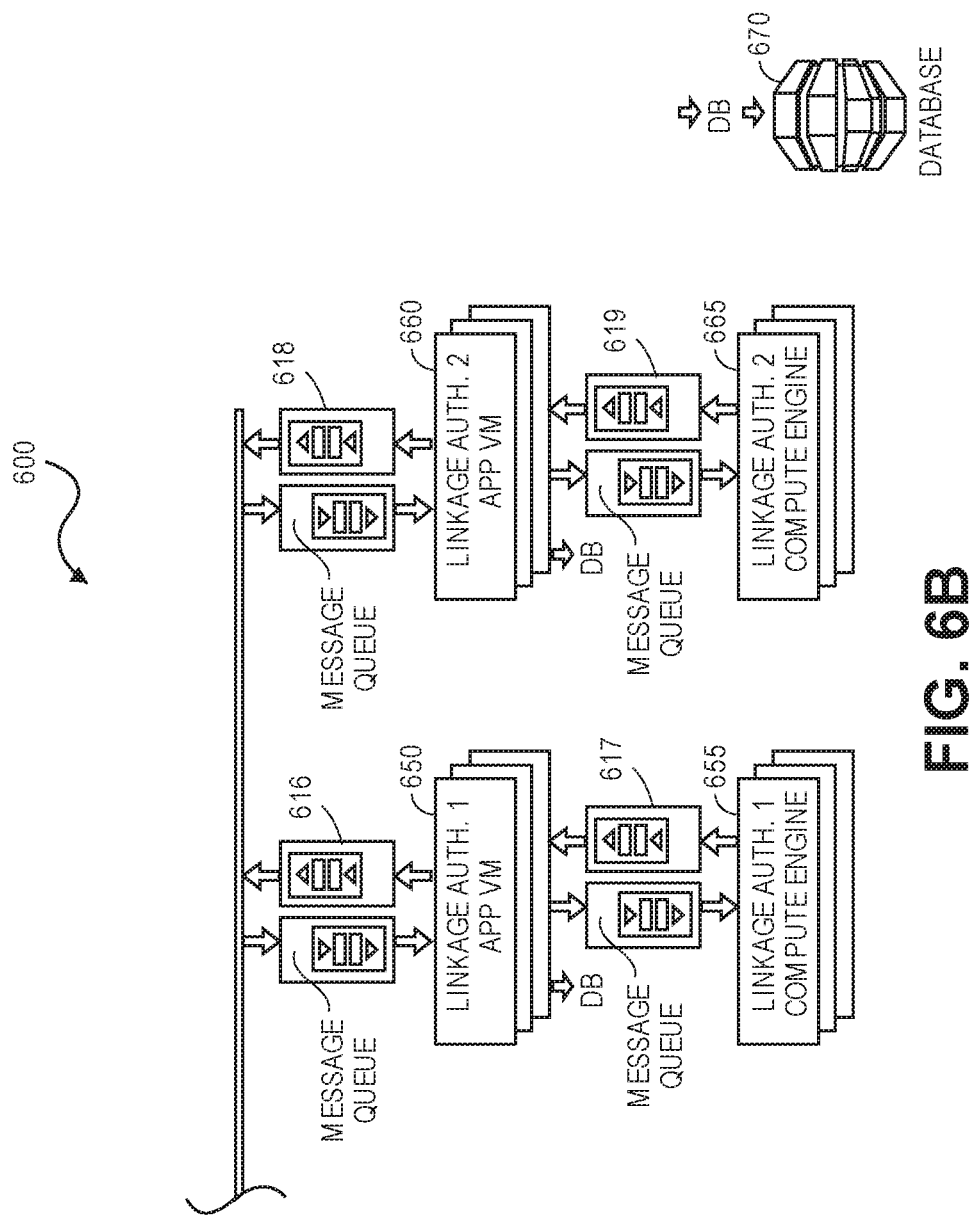
FIG. 6B is the second part of a block diagram of an example of a system for implementing a scalable and certificate management system with bidirectional message queues, consistent with implementations of the invention.

FIGS. 6A and 6B are together a block diagram of an example architecture for implementing a scalable and secure CMS 600 with bidirectional message queues 610, 611, 612, 613, 614, 615, 616, 617, 618, 619, consistent with implementations of the invention.

As with the CMS 400 described above with reference to FIGS. 4A and 4B, various implementations of the scalable CMS 600 may be used for extremely high volume device transaction and certificate generation processing. In some implementations, the scalable CMS 600 may be implemented using multiple servers, HSMs, multiple compute or computing engines, and multiple application platforms (e.g., VMs or hardware platforms). In the example implementation shown in FIGS. 6A and 6B, the application platforms may each include one or more virtual machines (VMs). In additional or alternative implementations, the application platforms may each include one or more hardware platforms, such as, for example, servers, computers, or other computer hardware capable of executing a software application. Examples of the scalable CMS 600 may be implemented in a private data center, a cloud data center such as Amazon web services (AWS) from Amazon, or in a hybrid of private and cloud data centers. For brevity, only the differences occurring within FIGS. 6A and 6B, as compared to FIGS. 4A and 4B, are described below.

As shown in the example of FIG. 6A, the architecture of the CMS 600 may include two provisioning controllers 602—a primary and a standby, which preferably are implemented in separate servers. The two provisioning controllers 602 include functionality similar to the provisioning controllers 102 of FIG. 4A such that objects, data, etc. contained in the primary provisioning controller are copied or otherwise contained in the standby (secondary) provisioning controller for failover purposes as described above with reference to FIG. 4A. In certain implementations, the provisioning controllers 602 may be DLM controllers, e.g., a primary and standby DLM controller. In various implementations, the provisioning controllers 602 may be controllers that are present for each type of component in the CMS 600. In the example of FIGS. 6A and 6B, the provisioning controllers 602 may be a pair of controllers (e.g., primary and standby) that are present for a registration authority 620, an enrollment certificate authority 430, a pseudonym certificate authority 440, and linkage authorities 450, 460

As illustrated in FIGS. 6A and 6B, the architecture of the scalable CMS 600 includes a registration authority 605 implemented as a REST web service, a registration authority 620, a registration authority compute engine 625, an enrollment certificate authority 630, an enrollment certificate authority compute engine 635, a pseudonym certificate authority 640, a pseudonym certificate authority compute engine 645, a linkage authority 1 650, a linkage authority 1 compute engine 655, a linkage authority 2 660, a linkage authority 1 compute engine 665, bidirectional message queues 610, 611, 612, 613, 614, 615, 616, 617, 618, 619, and a database 670.

The architecture of the scalable CMS 600 advantageously separates the non-security-related applications from the security functions. In the non-limiting example of FIGS. 6A and 6B, the registration authority 620, the enrollment certificate authority 630, the pseudonym certificate authority 640, and the linkage authorities 650, 660 are implemented as applications on their own VMs, which execute on their own dedicated compute engines 625, 635, 645, 655, and 665, all of which are separate from any non-security-related applications and functions. This provides both a technical and security advantage and improvement over conventional systems, in which the performance of the HSMs is slow or in which the cloud service provider cannot supply HSMs or in which their proper management of the HSMs is uncertain. In the scalable CMS 600, all cryptographic operations that require an HSM are performed in a compute engine (e.g., one or more of compute engines 625, 635, 645, 655, and 665). That is, in the CMS 600, all cryptographic operations that require an HSM are performed in a compute engine.

By separating the critical security functions from each other and onto separate compute engines, as shown in FIGS. 6A and 6B, the computation-intensive crypto and security functions, for example, as performed by the registration authority 620, the enrollment certificate authority 630, the pseudonym certificate authority 640, and the linkage authorities 650, 660, are performed significantly faster than existing registration authority systems. This design enables significant improvements in transaction processing by enabling the "bottleneck" applications to be individually scaled as needed. For instance, if the registration authority application running on registration authorities 605 and 620 needs to scale, additional application platforms (e.g., VMs or hardware platforms) can be added while no change may be required in the secure compute capability of the registration authority compute engine(s) 625. Also, for example, if the security computations are limiting performance, additional secure registration authority compute engines 625 can be added. This same multi-dimensional scaling is true for the other components of the CMS 600.

In the example shown in FIGS. 6A and 6B, the registration authority 605 is connected to the other components, and the other components are connected to each other by bidirectional message queues 610, 611, 612, 613, 614, 615, 616, 617, 618, and 619. In the example implementation of FIGS. 6A and 6B the bidirectional message queues 610, 611, 612, 613, 614, 615, 616, 617, 618, and 619 are bidirectional in that the messages in these queues flow in two directions (e.g., between a client and a server). This provides the performance benefit of separating new requests from pending responses in the message queues. By using bidirectional message queues 610, 611, 612, 613, 614, 615, 616, 617, 618, 619 to communicatively connect the application platforms (e.g., VMs and/or hardware platforms) and the compute engines to each other, the application platforms (e.g., VMs and/or hardware platforms) and compute engines can be independently scaled. In the CMS 600, the respective application platforms (e.g., VMs and/or hardware platforms) for the registration authority 620, the enrollment certificate authority 630, the pseudonym certificate authority 640, and the linkage authorities 650, 660 are communicatively connected to compute engines 625, 635, 645, 655, and 665 via respective sets of bidirectional message queues.

In the CMS 600, the registration authority 605 (and the other components of FIGS. 6A and 6B shown with "DB" arrows) may be connected to a database 670. In preferred implementations, the database 670 is a fast access, low-latency database. In certain implementations, the database 670 may be a NoSQL database or database service, such as, for example, the DynamoDB data service offered by Amazon web services. In various implementations, the data stored in the database 670 is application dependent, but may include previously issued certificates, various linkage authority values (e.g., linkage values), data on devices to whom certificates have been issued, operator actions, etc. The data may be stored either unencrypted, encrypted, or some combination thereof.

In various implementations, the scalable CMS 600 includes an enrollment certificate authority 630 and a pseudonym certificate authority 640, as the digital certificates produced by the registration authority 605 are split into different segments—e.g., an enrollment digital certificate and pseudonym digital certificates.

As illustrated by the three "stacked" rectangles in FIG. 6A for the enrollment certificate authority 630, in some implementations there may be multiple instances of the enrollment certificate authority 630 executing simultaneously. This is similarly represented for the other "stacked" elements of FIGS. 6A and 6B. The enrollment certificate authority 630 may receive multiple requests for enrollment certificates from the registration authority 620.

In various implementations, the compute engines 625, 635, 645, 655, and 665 and the provisioning controller 602 include HSMs, which allow these components to perform secure computations without being unduly threatened from hackers. In some implementations, the compute engines 625, 635, 645, 655, and 665 may be designed to perform secure computations themselves without requiring an embedded HSM—in such implementations, they embody the HSM.

One of ordinary skill will recognize that the components, processes, data, operations, and implementation details shown in FIGS. 6A and 6B are examples presented for conciseness and clarity of explanation. Other components, processes, implementation details, and variations may be used without departing from the principles of the invention, as this example is not intended to be limiting and many variations are possible.

Figure 7A:
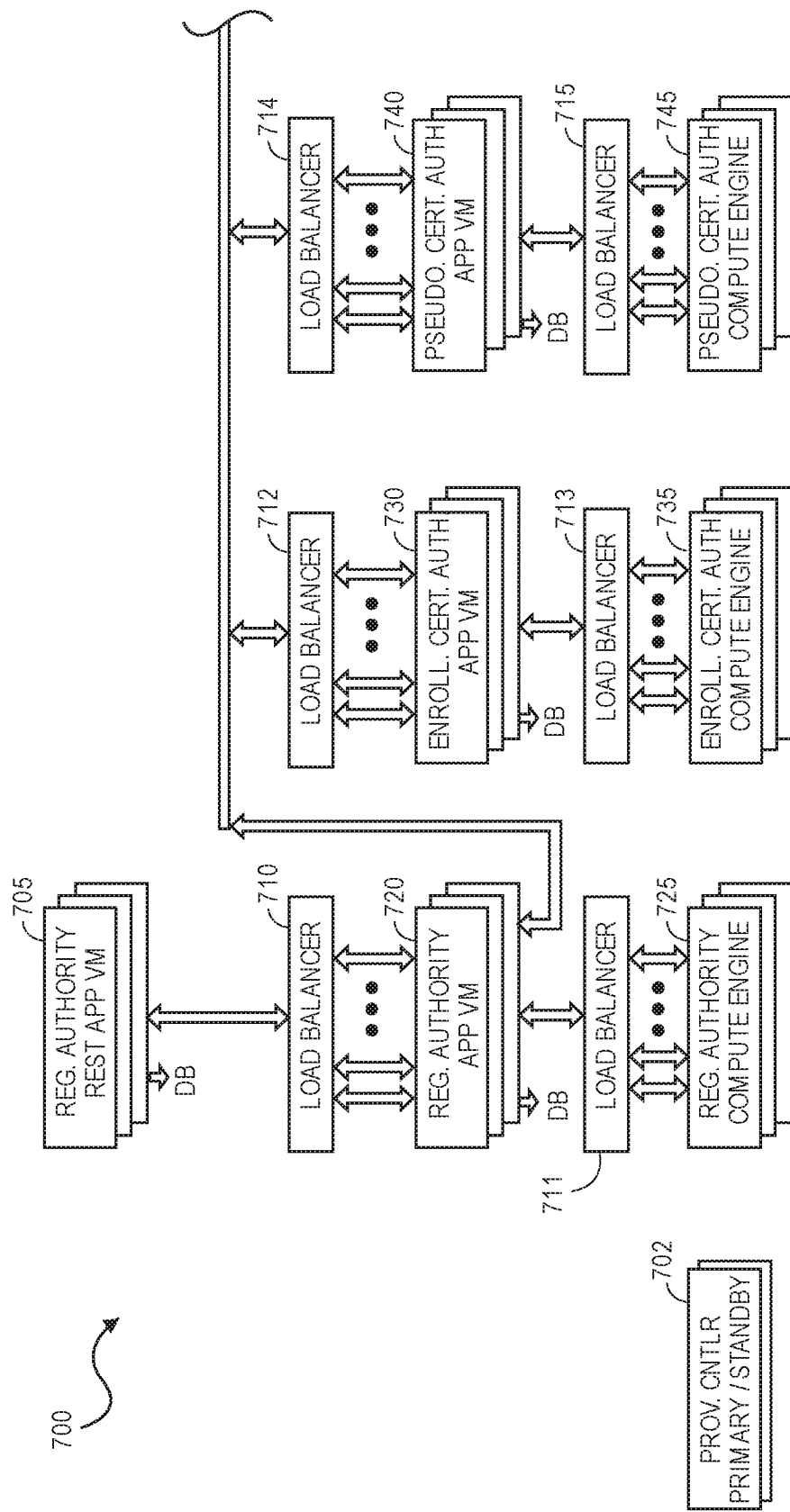
FIG. 7A is the first part of a block diagram of an example of a system for implementing a scalable and secure certificate management system with load balancers, consistent with implementations of the invention.
Figure 7B:
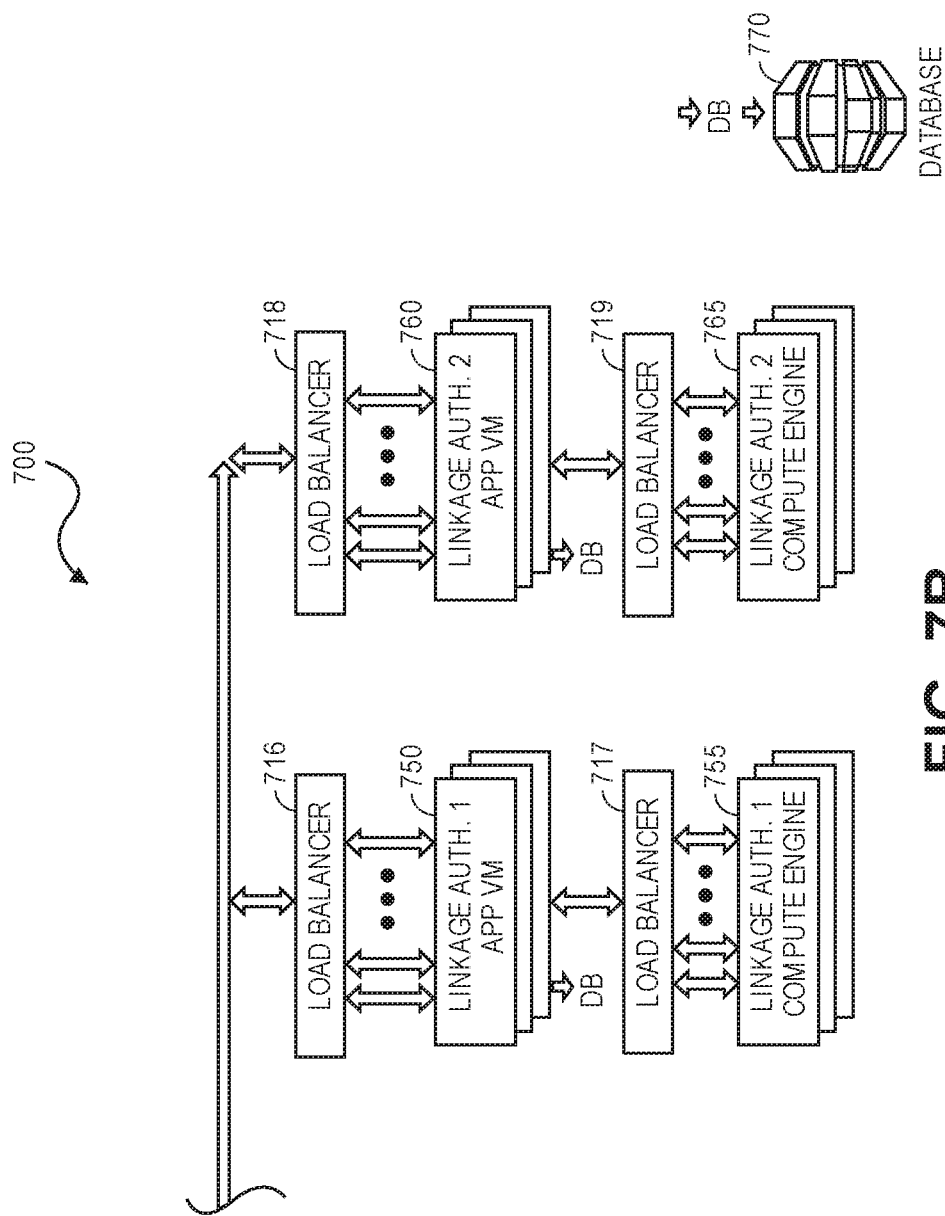
FIG. 7B is the second part of a block diagram of an example of a system for implementing a scalable and secure certificate management system with load balancers, consistent with implementations of the invention.

FIGS. 7A and 7B are together a block diagram of an example architecture for implementing a scalable and secure CMS 700 with load balancers 710, 711, 712, 713, 714, 715, 716, 717, 718, 719, consistent with implementations of the invention.

As with the CMS 400 and 600 described above with reference to FIGS. 4 and 6, various implementations of the scalable CMS 700 may be used for extremely high volume device transaction and certificate generation processing. For brevity, only the differences occurring within FIGS. 7A and 7B, as compared to FIGS. 4 and 6, are described below. In the example implementation shown in FIGS. 7A and 7B, the application platforms are depicted as including one or more virtual machines (VMs). In additional or alternative implementations, the application platforms may each include one or more hardware platforms, such as, for example, application servers, server farms, cloud-based servers, processors that are configured to perform the application operations, or other computer hardware capable of executing a software application.

As shown in the example of FIG. 7A, the architecture of the CMS 700 may include two provisioning controllers 702-a primary and a standby, which preferably are implemented in separate servers. The two provisioning controllers 702 include functionality similar to the provisioning controllers 120 and 602 of FIGS. 4A and 6A, respectively. That is, objects, data, etc. contained in the primary provisioning controller are copied or otherwise contained in the standby (secondary) provisioning controller for failover purposes as described above with reference to FIG. 4A.

As depicted in FIGS. 7A and 7B, the architecture of the scalable CMS 700 includes a registration authority 705 implemented as a REST web service, a registration authority 720, a registration authority compute engine 725, an enrollment certificate authority 730, an enrollment certificate authority compute engine 735, a pseudonym certificate authority 740, a pseudonym certificate authority compute engine 745, a linkage authority 1 750, a linkage authority 1 compute engine 755, a linkage authority 2 760, a linkage authority 1 compute engine 765, load balancers 710, 711, 712, 713, 714, 715, 716, 717, 718, 719, and a database 770.

As with the CMS 400 and the CMS 600 of FIGS. 4 and 6, the architecture of the scalable CMS 700 advantageously separates the non-security-related applications from the security functions. As shown in the non-limiting example of FIGS. 7A and 7B, the registration authority 720, the enrollment certificate authority 730, the pseudonym certificate authority 740, and the linkage authorities 750, 760 are implemented as applications on their own VMs, which execute on their own dedicated compute engines 725, 735, 745, 755, and 765, all of which are separate from any non-security-related applications and functions. In the scalable CMS 700, all cryptographic operations that require an HSM are performed in a compute engine (e.g., one or more of compute engines 725, 735, 745, 755, and 765). In the CMS 700, all cryptographic operations that require an HSM are performed in a compute engine.

By separating the critical security functions from each other and onto separate compute engines, as shown in FIGS. 7A and 7B, the computation-intensive crypto and security functions, for example, as performed by the registration authority 720, the enrollment certificate authority 730, the pseudonym certificate authority 740, and the linkage authorities 750, 760, are performed significantly faster than known registration authority solutions. This design enables significant improvements in transaction processing by enabling "bottleneck" applications to be individually scaled up as needed and without being bound by a server's processing or storage capacity. For instance, if the registration authority application running on registration authorities 705 and 720 needs to scale, additional application platforms (e.g., VMs or hardware platforms) can be added while no change may be required in the secure compute capability of the registration authority compute engine(s) 725. Also, for example, if the security computations are limiting performance, additional secure registration authority compute engines 725 can be added. This same multi-dimensional scaling is true for the other components of the CMS 700.

In the example shown in FIGS. 7A and 7B, the registration authority 705 is connected to the other components, and the other components are connected to each other by load balancers 710, 711, 712, 713, 714, 715, 716, 717, 718, and 719. In the example implementation of FIGS. 7A and 7B the load balancers 710, 711, 712, 713, 714, 715, 716, 717, 718, and 719 may be implemented either as virtual load balancers (e.g., running on VMs) or via dedicated hardware. As seen in FIGS. 7A and 7B, in the CMS 700, each of the load balancers 710, 711, 712, 713, 714, 715, 716, 717, 718, and 719 is inserted in front of each group of similar types of VMs or compute engines. This provides the benefit of having a client or clients only see a single server endpoint, and a load balancer decides which server will handle a given request. In this way, the load balancers 710, 711, 712, 713, 714, 715, 716, 717, 718, 719 communicatively connect the application platforms (e.g., VMs and/or hardware platforms) and the compute engines to each other. In the CMS 700, the respective application platforms for the registration authority 720, the enrollment certificate authority 730, the pseudonym certificate authority 740, and the linkage authorities 750, 760 are communicatively connected to compute engines 725, 735, 745, 755, and 765 via respective sets of load balancers.

In various implementations, the scalable CMS 700 includes an enrollment certificate authority 730 and a pseudonym certificate authority 740, as the digital certificates produced by the registration authority 705 are split into different segments—e.g., an enrollment digital certificate and pseudonym digital certificates.

As illustrated by the three "stacked" rectangles in FIG. 7A for the pseudonym certificate authority 740, in various implementations there may be multiple instances of the pseudonym certificate authority 740 executing simultaneously. This is similarly represented for the other "stacked" elements of FIGS. 7A and 7B. The pseudonym certificate authority 740 may receive multiple requests for batches of pseudonym certificates from the registration authority 720 (e.g., requests for a week's, month's, or year's worth of pseudonym certificates).

One of ordinary skill will recognize that the components, processes, data, operations, and implementation details shown in FIGS. 7A and 7B are examples presented for conciseness and clarity of explanation. Other components, processes, implementation details, and variations may be used without departing from the principles of the invention, as this example is not intended to be limiting and many variations are possible.

Figure 8:
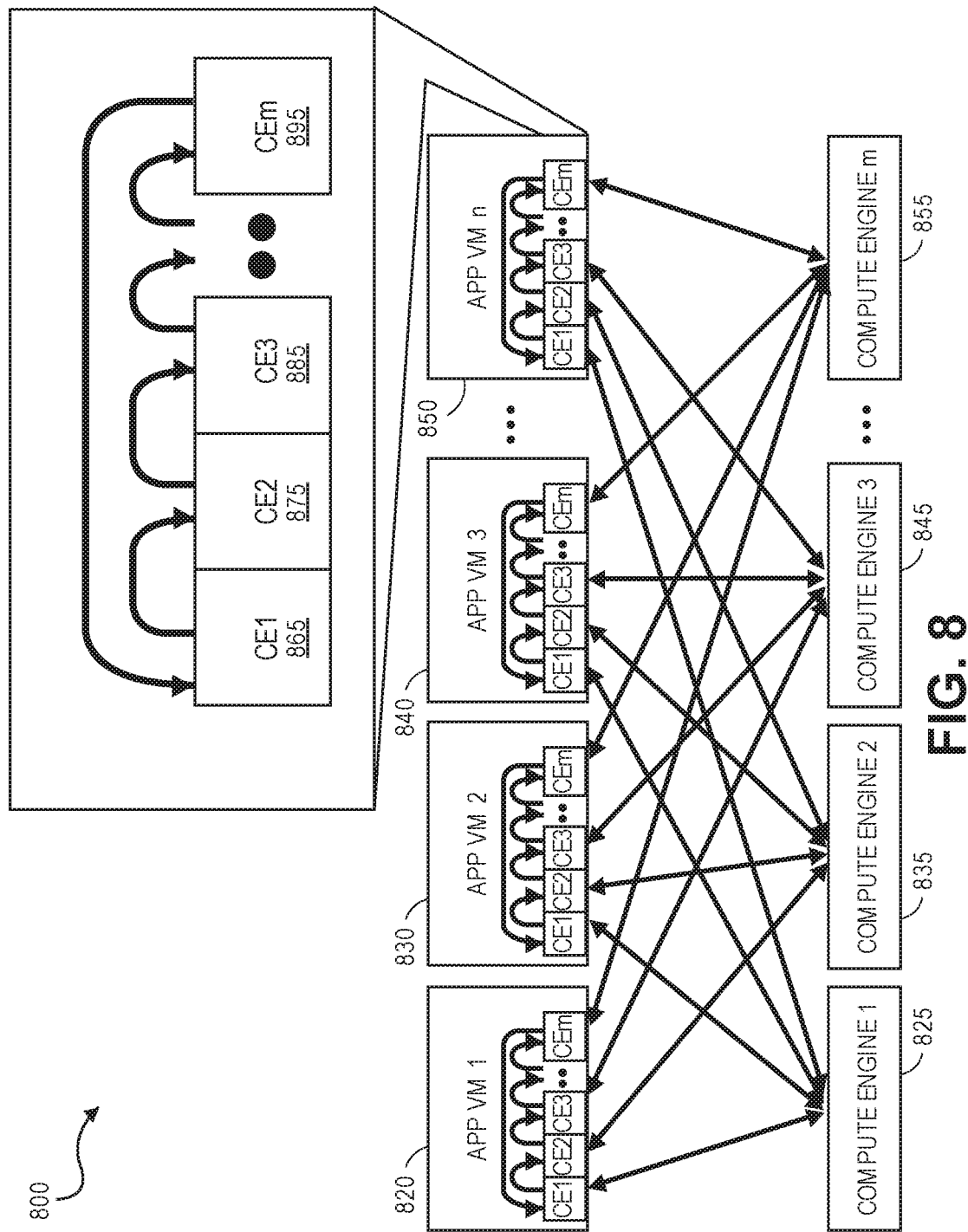
FIG. 8 is a block diagram of an example of a system for implementing a scalable and secure certificate management system with round robin requests, consistent with implementations of the invention.

FIG. 8 is a block diagram of an example of a system 800 for implementing a scalable and secure CMS with round robin requests, consistent with implementations of the invention. For the sake of simplicity, only one set of application platforms (e.g., VMs and/or hardware platforms) 820, 830, 840, 850 and compute engines 825, 835, 845, 855 are shown In FIG. 8. Note that the application platforms 820, 830, 840, 850 and compute engines 825, 835, 845, 855 in FIG. 8 can be any of the sets of application platforms and compute engines used to implement any of the registration authority 720, the enrollment certificate authority 730, the pseudonym certificate authority 740, and the linkage authorities 750, 760 described above with reference to FIG. 7. As with the CMS 700 of FIG. 7, in the system 800, all cryptographic operations that require an HSM are performed in a compute engine, and the application platforms and compute engines all scale independently.

With continued reference to FIG. 8, round robin refers to using the knowledge of each server (e.g., each compute engine) that is available. The round robin requests sent in system 800 use the knowledge of available compute engines (e.g., compute engines 825, 835, 845, 855) to distribute requests and messages sent to that set of compute engines.

For clarity of illustrating the sequencing of round robin requests in the system 800, an enlarged set of compute engines 865, 875, 885, 895 available to application VM 850 is shown. In the example of FIG. 8, there are "n" application platforms (e.g., VMs and/or hardware platforms) and there are "m" compute engines available. A client (e.g., application VM 895) that wants to make a request to a compute engine, does so in the order shown in FIG. 8. As shown, the first request from application VM 895 is to CE1 (compute engine 865), the second request is to CE2 (compute engine 875), and so on. When the last CE, CEm (compute engine 895) is reached, the client (application VM 895) starts over at CE1.

In the system 800, all clients (e.g., application platforms 820, 830, 840, 850) are aware of all servers (e.g., the set of available compute engines) that they need to communicate with. Each client performs a round-robin request to each server, which advantageously distributes the workload evenly across all servers. In certain embodiments, the load balancers 710, 711, 712, 713, 714, 715, 716, 717, 718, 719 of the CMS 700 show in FIG. 7 may send round robin requests to compute engines to evenly distribute workload across compute engines.

Figure 9:
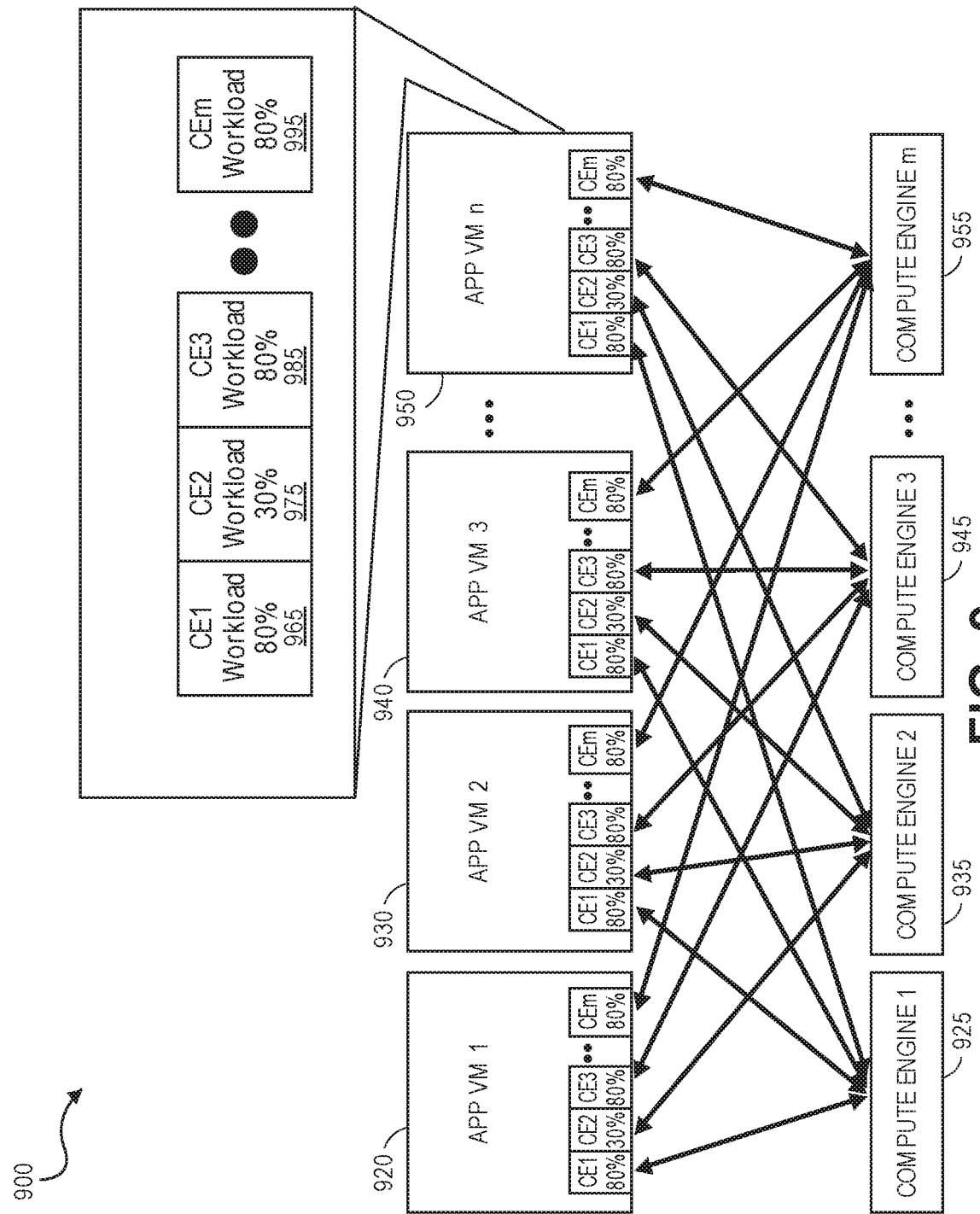
FIG. 9 is a block diagram of an example of a system for implementing a scalable and secure certificate management system with requests based on workload, consistent with implementations of the invention.

FIG. 9 is a block diagram of an example of a system 900 for implementing a scalable and secure CMS with requests based on workload, consistent with implementations of the invention. For brevity, only the differences occurring within FIG. 9, as compared to FIGS. 7 and 8, are described below.

As with FIG. 8, for the sake of simplicity and clarity, only one set of application platforms 920, 930, 940, 950 and compute engines 925, 935, 945, 955 are shown In FIG. 9. Note that the application platforms (e.g., VMs and/or hardware platforms) 920, 930, 940, 950 and compute engines 925, 935, 945, 955 in FIG. 9 may be any of the sets of application platforms and compute engines used to implement any of the registration authority 720, the enrollment certificate authority 730, the pseudonym certificate authority 740, and the linkage authorities 750, 760 described above with reference to FIG. 7. As with the CMS 700 of FIG. 7, in the system 900, all cryptographic operations that require an HSM are performed in a compute engine, and the application platforms (e.g., VMs and/or hardware platforms) and compute engines all scale independently.

With continued reference to FIG. 9, a workload distribution technique is enabled by adding the intelligence to first query the workload of each server used. The workload distribution technique is workload-based in that it uses the knowledge of the workload of each server (e.g., each compute engine) that is available. The requests sent in system 900 use the knowledge of current workload for available compute engines (e.g., compute engines 925, 935, 945, 955) to distribute requests and messages sent to that set of compute engines. In the system 900, requests are sent to compute engines based on a reported, respective workload of each of the compute engines.

For clarity of illustrating the workload-based requests in the system 900, an enlarged set of compute engines 965, 975, 985, 995 that report their respective workloads to application VM 950 is shown. In the example of FIG. 9, "m" is the number of application platforms and "n" is the number of compute engines reporting their workloads. In the example of FIG. 9, workloads are reported as a percentage, where a 30% workload for compute engine 975 indicates that compute engine 975 is currently running at 30% of its total capacity. Similarly, workloads of 80% reported by compute engines 965, 985, and 995 indicate that these compute engines are each currently running at 80% of their total capacity. In certain implementations, the current workload reported by a given compute engine indicates the workload of an HSM embedded in that compute engine. For instance, in cases where a compute engine's processing capacity is bound or constrained by its HSM's capacity for performing cryptographic operations, the workload percentage reported by the compute engine may reflect the HSM's current workload. For example, if an HSM used by compute engine 975 is running at 30% of its processing capacity, then compute engine 975 may report that it is running at 30% of its total capacity. In some implementations, the workload percentage may be a weighted measure of a server's (e.g., a compute engine) processing capacity, communications capacity (e.g., a measure of available bandwidth for a direct communication link or wireless module), and storage/memory capacity. In an example, processing, communications, and memory capacities may be given equal one-third weights. In this example, if the compute engine 975 is using 25% of its central processing unit (CPU) capacity, 35% of its communications capacity, and 30% of its available memory or storage, the compute engine 975 will report that its workload is 30%.

In certain implementations, environmental measurements for a compute engine may be weighted and considered in combination with workload measurements. For instance, an overall health measurement of a compute engine may be determined and reported along with the compute engine's workload measurement. In some examples, a health measurement for a given compute engine may be a function of one or more of: the compute engine's operating temperature (e.g., higher than average temperature readings from thermal sensors can indicate that a CPU, memory module, or disk drive is susceptible to a thermal shutdown or malfunction); a humidity level inside the compute engine's enclosure; a frequency of restarts or reboots (e.g., thermal shutdowns or crashes); time since a most-recent restart; a number of disk failures or memory faults in a recent duration (e.g., in the previous day, week, or month); time until a scheduled maintenance event for the compute engine (e.g., a software or firmware update, replacement of a faulty hardware component); an indication that the compute engine is running on a backup power supply; or a duration since a last power outage or voltage reduction for the compute engine's power supply.

In additional or alternative implementations, other weights, measures, and metrics may be used to determine a workload for a compute engine. For example, if compute engines performing cryptographic operations have been historically more constrained by their CPU capacities than their communications or memory capacities, then CPU capacity may be given a greater weight than other capacity when determining an overall workload percentage for those compute engines.

In the system 900, a client (e.g., application VM 995) that wants to make a request to a compute engine, does so based on the workloads reported by compute engines. In the example of FIG. 9, the next request from application VM 995 will be to CE2 (compute engine 975) based on its relatively low workload of 30%. That is, because compute engine 975 has the lowest workload of the set of compute engines 965, 975, 985, 995. When the next request is to be sent from application VM 995 to a compute engine, any of CE1 (compute engine 965), or CE3 (compute engine 985), or CEm (compute engine 995) may be used as they are all currently reporting equal 80% workloads. In cases where each available compute engine is reporting the same or similar workloads, sequential requests may be used to distribute workload evenly across these equally-loaded compute engines. That is, if each available compute engine is reporting a substantially equal or equal workload, requests as described above with reference to FIG. 8 may be used. Over time, as workloads change, the client (application VM 995) will send subsequent requests to the least-loaded compute engine that is available.

In the system 900, all clients (e.g., application platforms 920, 930, 940, 950) are aware of the workloads of all servers (e.g., the set of available compute engines) that they need to communicate with. Each client may submit workload queries to each server and use the reported workloads to advantageously distribute workload evenly across all servers. In certain embodiments, the load balancers 710, 711, 712, 713, 714, 715, 716, 717, 718, 719 of the CMS 700 show in FIG. 7 may send workload-based requests to compute engines to evenly distribute workload across compute engines.

Figure 10A:
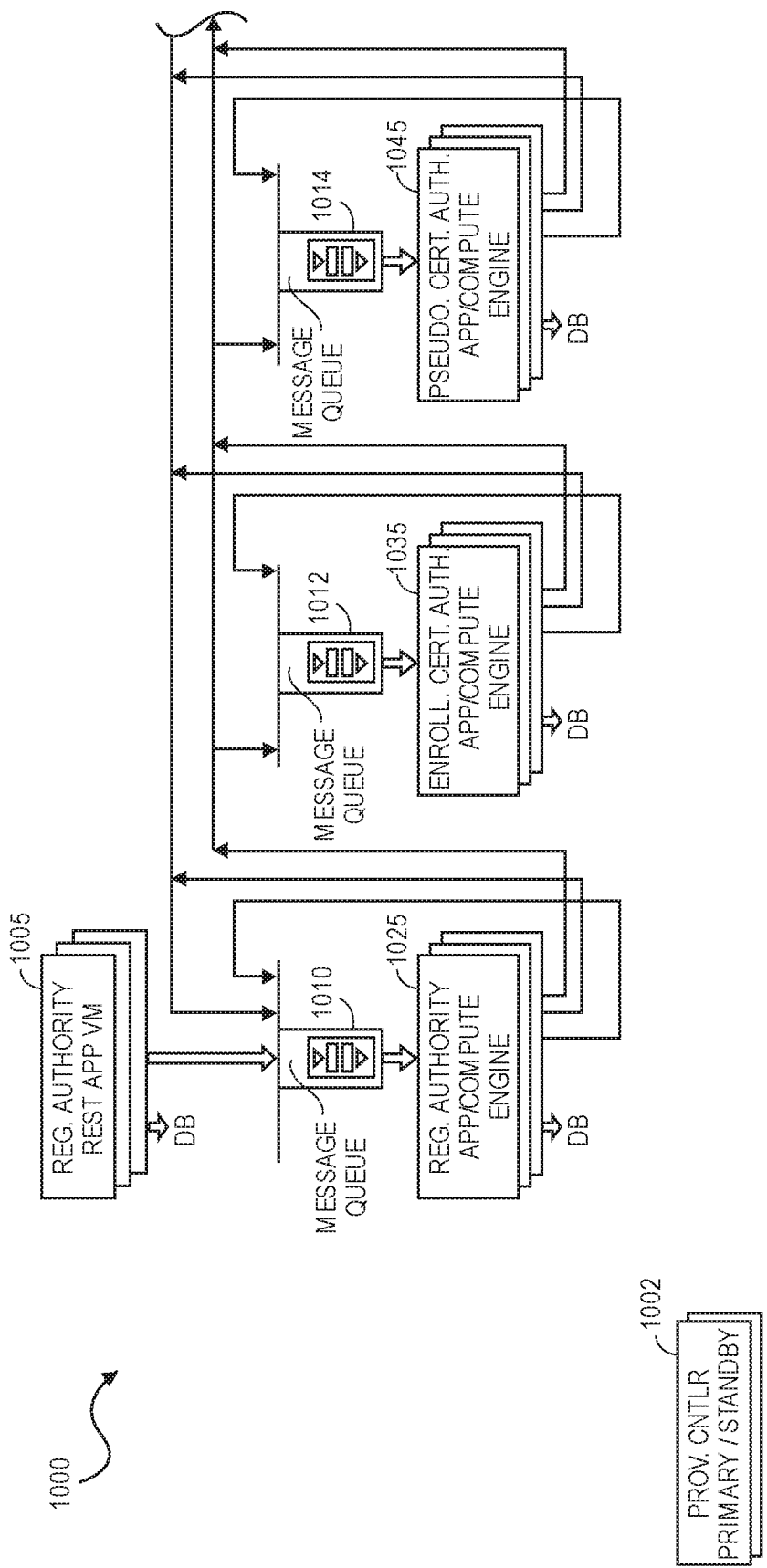
FIG. 10A is the first part of a block diagram of an example of a system for implementing a scalable and secure digital asset management system with message queues, consistent with implementations of the invention.
Figure 10B:
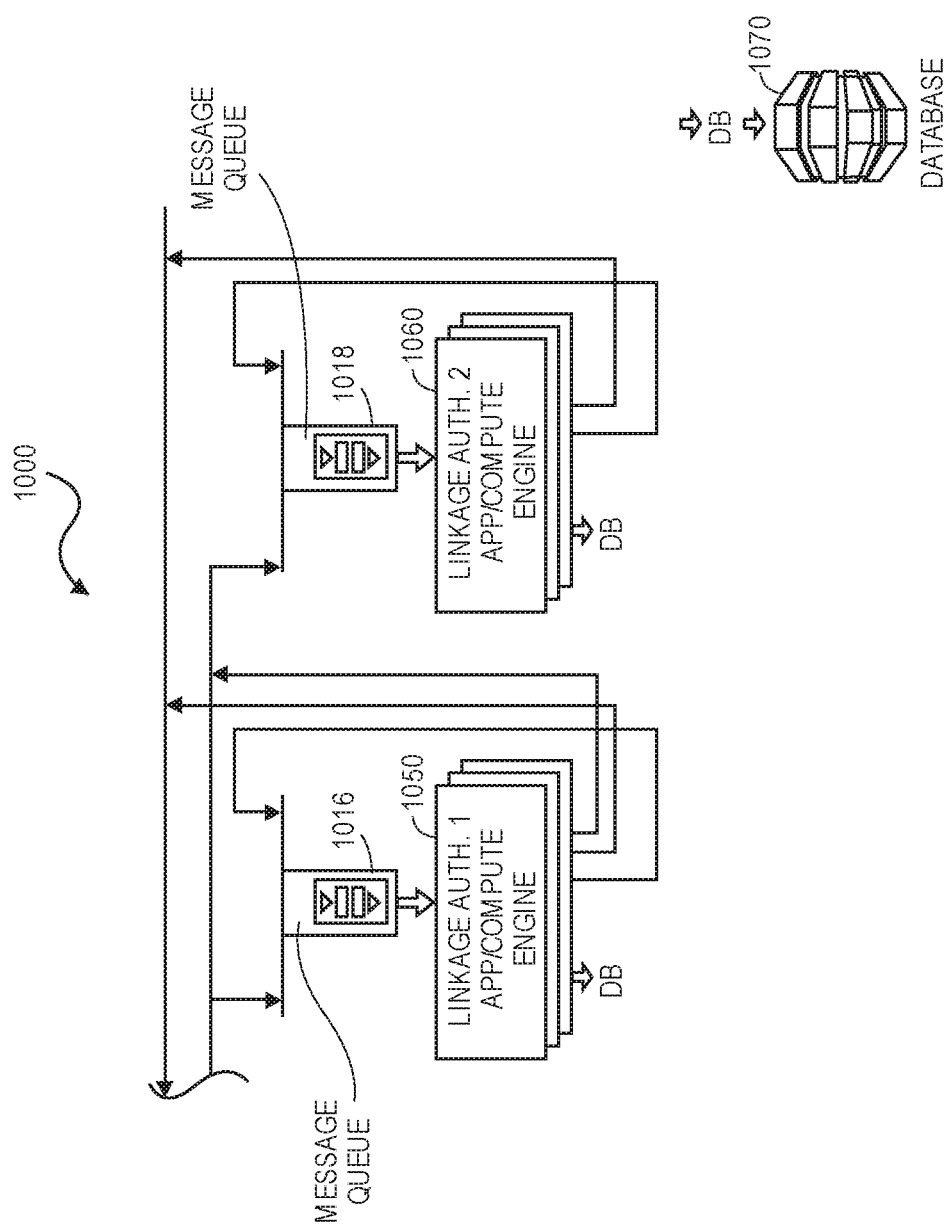
FIG. 10B is the second part of a block diagram of an example of a system for implementing a scalable and secure certificate management system with message queues, consistent with implementations of the invention.

FIGS. 10A and 10B are together a block diagram of an example architecture for implementing a scalable and secure certificate management system (CMS) 400, in accordance with implementations of the invention. For brevity, only the differences occurring within FIGS. 10A and 10B, as compared to FIGS. 4A and 4B, are described below.

As shown in the example of FIG. 10A, the architecture of the CMS 1000 may include two provisioning controllers 1002—a primary and a standby, which preferably are implemented in separate servers. The two provisioning controllers 1002 include functionality similar to the provisioning controllers 120 and 602 of FIGS. 4A and 6A, respectively. That is, objects, data, etc. contained in the primary provisioning controller are copied or otherwise contained in the standby (secondary) provisioning controller for failover purposes as described above with reference to FIG. 4A.

As depicted in FIGS. 10A and 10B, the architecture of the CMS 1000 includes a registration authority 1005 implemented as a REST web service, a registration authority 1020, compute engines 1025, 1035, 1045, 1050, 1060, message queues 1010, 1012, 1014, 1016, 1018, and database 1070.

Examples of the CMS 1000 may be implemented in a private data center, a cloud data center, or in a hybrid of private and cloud data centers. Various implementations of the CMS 1000 may be used for extremely high volume device transaction and certificate generation processing. In various implementations, the CMS 1000 may be implemented using multiple servers, HSMs, and multiple compute or computing engines that serve as application platforms. That is, as shown in FIGS. 10A and 10B, the depicted applications for the registration authority, certificate authorities, and linkage authorities each run one or more compute engines that are capable of hosting and executing a software application.

The CMS 1000 is similar to the CMS 400 described above with reference to FIGS. 4A and 4B with the difference of using the compute engines 1025, 1035, 1045, 1050, 1060 to host and run applications. That is, the CMS 1000 architecture is an alternative to the architecture of the CMS 400 where applications for the registration authority, the enrollment certificate authority, the pseudonym certificate authority, and the linkage authorities execute on their own dedicated compute engines 1025, 1035, 1045, 1050, and 1060. In the CMS 1000, all cryptographic operations that require an HSM are performed in a compute engine (e.g., compute engines 1025, 1035, 1045, 1050, and 1060) that also runs an associated application. Advantageously, by executing applications and cryptographic operations on the compute engines 1025, 1035, 1045, 1050, 1060, the architecture of the CMS 1000 reduces the number of message queues needed.

In the example of FIGS. 10A and 10B, the compute engines include a registration authority compute engine 1025 that hosts and runs a registration authority application, an enrollment certificate authority compute engine 1035 that is operable to host and run an enrollment certificate authority application, a pseudonym certificate authority compute engine 1045 that is operable to host and run a pseudonym certificate authority application, a linkage authority 1 compute engine 1050 that hosts and runs a linkage authority 1 application, and a linkage authority 2 1060 operable to host and run a linkage authority 2 application.

As shown in FIGS. 10A and 10B, the registration authority 1005 is connected to the other components, and the other components are connected to each other, by a messaging subsystem or message queuing service, which includes the input message queues 1010, 1012, 1014, 1016, 1018. In the example implementation of FIGS. 10A and 10B the input message queues 1010, 1012, 1014, 1016, 1018 are unidirectional in that the messages in these queues flow one direction (e.g., from a client to a server). This provides the technical benefit of simplicity by having a single input queue for each of the compute engines, which also each host and run their respective applications.

By using input message queues 1010, 1012, 1014, 1016, 1018 to communicatively connect the compute engines to each other, the compute engines can be independently scaled as needed. That is, since the respective compute engines serving as application platforms for the registration authority, the enrollment certificate authority, the pseudonym certificate authority, and the linkage authority applications are communicatively connected via respective input message queues, these components of the CMS 1000, as well as the database 1070, all scale independently from each other.

Figure 11:
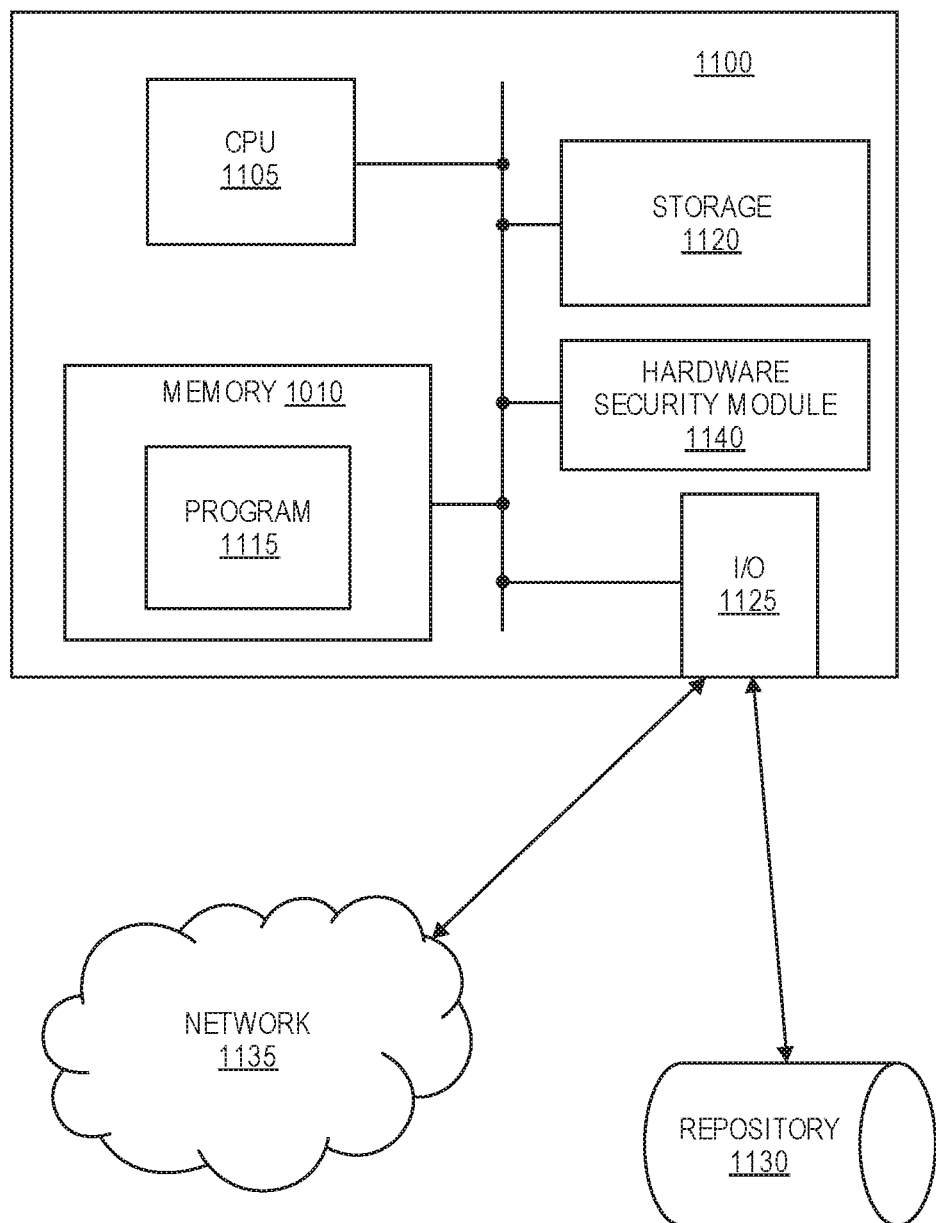
FIG. 11 is a block diagram of an example of a computing system that may be used for hosting systems and methods consistent with implementations of the invention.

FIG. 11 is a block diagram of an example of a computing environment 1101, which includes a computing system 1100 that may be used for implementing systems and methods consistent with implementations of the invention. Other components and/or arrangements may also be used. In some implementations, computing system 1100 may be used to implement, at least partially, various components of FIGS. 1-10, such as the provisioning controller 120, the DAMS 110, and the compute engines of the CMS architectures of FIGS. 4 and 6-10, and the load balancers 710-719 of FIG. 7, among other things. In some implementations, a series of computing systems similar to computing system 1100 may be each customized with specialized hardware and/or programmed as a specialized server to implement one of the components of FIGS. 1-10, which may communicate with each other via a network 1135.

In the example shown in FIG. 11, the computing system 1100 includes a number of components, such as a CPU 1105, a memory 1110, an input/output (I/O) device(s) 1125, a hardware security module (HSM) 1140, and a nonvolatile storage device 1120. System 1100 can be implemented in various ways. For example, an implementation as an integrated platform (such as a server, workstation, personal computer, laptop, etc.) may comprise a CPU 1105, a memory 1110, a nonvolatile storage 1120, and I/O devices 1125. In such a configuration, the components 1105, 1110, 1120, and 1125 may connect and communicate through a local data bus and may access a data repository 1130 (implemented, for example, as a separate database system) via an external I/O connection. The I/O component(s) 1125 may connect to external devices through a direct communication link (e.g., a hardwired or local wifi connection), through a network, such as a local area network (LAN) or a wide area network (WAN, such as a cellular telephone network or the Internet), and/or through other suitable connections. System 1100 may be standalone or it may be a subsystem of a larger system.

The CPU 1105 may be one or more known processor or processing devices, such as a microprocessor from the Core™ family manufactured by the Intel™ Corporation of Santa Clara, Calif. or a microprocessor from the Athlon™ family manufactured by the AMD™ Corporation of Sunnyvale, Calif. The memory 1110 may be one or more fast storage devices configured to store instructions and information executed or used by the CPU 1105 to perform certain functions, methods, and processes related to implementations of the present invention. The storage 1120 may be a volatile or non-volatile, magnetic, semiconductor, tape, optical, or other type of storage device or computer-readable medium, including devices such as CDs and DVDs and solid state devices, meant for long-term storage.

In the illustrated implementation, the memory 1110 contains one or more programs or applications 1115 loaded from the storage 1120 or from a remote system (not shown) that, when executed by the CPU 1105, perform various operations, procedures, processes, or methods consistent with the present invention. Alternatively, the CPU 1105 may execute one or more programs located remotely from the system 1100. For example, the system 1100 may access one or more remote programs via the network 1135 that, when executed, perform functions and processes related to implementations of the present invention.

In one implementation, the memory 1110 may include a program(s) 1115 for performing the specialized functions and operations described herein for the provisioning controller 120, the DAMS 110, and/or the distributor appliance 118, 131. In some implementations, the memory 1110 may also include other programs or applications that implement other methods and processes that provide ancillary functionality to the invention.

The memory 1110 may be also be configured with other programs (not shown) unrelated to the invention and/or an operating system (not shown) that performs several functions well known in the art when executed by the CPU 1105. By way of example, the operating system may be Microsoft Windows™, Unix™ Linux™ an Apple Computers™ operating system, or other operating system. The choice of operating system, and even to the use of an operating system, is not critical to the invention.

The HSM 1140 may be a device with its own processor that securely generates and stores digital security assets and/or securely performs a variety of cryptographic and sensitive computations. The HSM 1140 protects digital security assets, such as cryptographic keys, and other sensitive data from possible access by an attacker. In some implementations, the HSM may be a plug-in card or board that attaches directly to the computing system 1100.

The I/O device(s) 1125 may comprise one or more input/output devices that allow data to be received and/or transmitted by the system 1100. For example, the I/O device 1125 may include one or more input devices, such as a keyboard, touch screen, mouse, and the like, that enable data to be input from a user. Further, the I/O device 1125 may include one or more output devices, such as a display screen, a CRT monitor, an LCD monitor, a plasma display, a printer, speaker devices, and the like, that enable data to be output or presented to a user. The I/O device 1125 may also include one or more digital and/or analog communication input/output devices that allow the computing system 1100 to communicate, for example, digitally, with other machines and devices. Other configurations and/or numbers of input and/or output devices may be incorporated in the I/O device 1125.

In the implementation shown, the system 1100 is connected to a network 1135 (such as the Internet, a private network, a virtual private network, a cellular network or other network or combination of these), which may in turn be connected to various systems and computing machines, such as servers, personal computers, laptop computers, client devices, etc. In general, the system 1100 may input data from external machines and devices and output data to external machines and devices via the network 1135.

In the exemplary implementation shown in FIG. 11, the data source 1130 is a standalone database external to system 1100, such as the database 125. In other implementations, the data source 1130 may be hosted by the system 1100. In various implementations, the data source 1130 may manage and store data used to implement systems and methods consistent with the invention. For example, the data source 1130 may manage and store data structures that contain the status and log information for each device 116 provisioned by the system 110, and the like.

The data source 1130 may comprise one or more databases that store information and are accessed and/or managed through the system 1100. By way of example, the database 1130 may be an Oracle™ database, a Sybase™ database, or other relational database. Systems and methods consistent with the invention, however, are not limited to separate data structures or databases, or even to the use of a database or data structure.

One of ordinary skill will recognize that the components and implementation details of the system in FIG. 11 are examples presented for conciseness and clarity of explanation. Other components and implementation details may be used.

Although the foregoing examples use specific examples of computerized devices, such a OBUs, ECUs, and RSUs, for clarity of explanation, the invention is not limited to those specific examples. Various implementations consistent with the invention may be used with and for a wide variety of computerized devices, such as medical device (e.g., dialysis machines, infusion pumps, etc.); robots; drones; autonomous vehicles; and wireless communication modules (e.g., embedded Universal Integrated Circuit Cards (eUICC)), among others.

The various operations of the applications described herein may be performed, at least partially, by one or more VMs. In additional or alternative implementations, the operations of the applications described herein may be performed, at least partially by one or more processors that are temporarily configured (e.g., by software) or permanently configured to perform the relevant operations. Whether temporarily or permanently configured, such processors may constitute processor-implemented modules that operate to perform one or more application operations, functions, and roles described herein. As used herein, the term 'processor-implemented module' refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within an office environment, a manufacturing environment, or a server farm). In other example embodiments, the processors or processor-implemented modules may be distributed across a number of geographic locations.

Other implementations of the invention will be apparent to those skilled in the art from consideration of the specification and practice of the invention disclosed herein. It is intended that the specification and examples be considered as exemplary only, with a true scope of the invention being indicated by the claims below.

What is claimed is:

1. A scalable certificate management system for securely providing certificates to a provisioning controller, the scalable certificate management system comprising:

one or more application platforms that run a registration authority application and that are communicatively connected to one or more compute engines that perform cryptographic computations required by the registration authority application;

one or more application platforms that run an enrollment certificate authority application and that are communicatively connected to one or more compute engines that perform cryptographic computations required by the enrollment certificate authority application, wherein the enrollment certificate authority application is operable to generate and conditionally transmit an enrollment certificate to the registration authority application, and wherein the enrollment certificate authority application is operable to generate the enrollment certificates in response to receiving requests for the enrollment certificates from the registration authority application;

one or more application platforms that run a pseudonym certificate authority application and that are communicatively connected to one or more compute engines that perform cryptographic computations required by the pseudonym certificate authority application, wherein the pseudonym certificate authority application is operable to generate and conditionally transmit pseudonym certificates to the registration authority application, and wherein the pseudonym certificate authority application is operable to generate the pseudonym certificates in response to receiving requests for the pseudonym certificates from the registration authority application;

one or more application platforms that run a first linkage authority application and that are communicatively connected to one or more compute engines that perform cryptographic computations required by the first linkage authority application; and one or more application platforms that run a second linkage authority application and that are communicatively connected to one or more compute engines that perform cryptographic computations required by the second linkage authority application, wherein the first linkage authority application and the second linkage authority application are operable to generate and conditionally transmit linkage values to the registration authority application, and wherein the first linkage authority application and the second linkage authority application are operable to generate the linkage values in response to receiving requests for the linkage values from the registration authority application;

whereby the provisioning controller receives the enrollment certificate or the pseudonym certificates from the scalable certificate management system, wherein the scalable certificate management system assigns a digital certificate usage to each computerized device of a plurality of computerized devices, the digital certificate usage indicating a number of the pseudonym certificates to be used within a first time period by each of the computerized devices, and wherein the scalable certificate management system assigns one or more certificate loads to the computerized devices, the one or more certificate loads indicating a number of the pseudonym certificates to be stored within each computerized device during a second time period.

2. The certificate management system of claim 1, wherein the certificate management system further comprises:

one or more databases that are operably connected to the one or more application platforms that run the registration authority application, the one or more application platforms that run the enrollment certificate authority application, the one or more application platforms that run the pseudonym certificate authority application, the one or more application platforms that run the first linkage authority application, and the one or more application platforms that run the second linkage authority application.

3. The certificate management system of claim 2, where each of the registration authority application, the enrollment certificate authority application, the pseudonym certificate authority application, the first linkage authority application, the second linkage authority application, and the one or more database are operable to be scaled independently from each other.

4. The certificate management system of claim 1, wherein each of the registration authority application, the enrollment certificate authority application, the pseudonym certificate authority application, the first linkage authority application, and the second linkage authority application are communicatively connected to each other by a message queuing service comprising a plurality of message queues.

5. The certificate management system of claim 1, wherein:

the one or more application platforms that run the enrollment certificate authority application are one or more virtual machines that are communicatively connected to the one or more compute engines that perform the cryptographic computations required by the enrollment certificate authority application by a first plurality of message queues;

the one or more application platforms that run the first linkage authority application are one or more virtual machines that are communicatively connected to the one or more compute engines that perform the cryptographic computations required by the first linkage authority application by a second plurality of message queues; and the one or more application platforms that run the second linkage authority application are one or more virtual machines that are communicatively connected to the one or more compute engines that perform the cryptographic computations required by the second linkage authority application by a third plurality of message queues.

6. The certificate management system of claim 5, wherein:

the first plurality of message queues comprises:

a first message queue for queuing messages to be delivered to the one or more virtual machines that run the enrollment certificate authority application; and a second message queue for queuing messages to be delivered to the one or more compute engines that perform the cryptographic computations required by the enrollment certificate authority application;

the second plurality of message queues comprises:

a third message queue for queuing messages to be delivered to the one or more virtual machines that run the first linkage authority application; and age queue for queuing messages to be delivered to the one or more compute engines that perform the cryptographic computations required by the first linkage authority application; and the third plurality of message queues comprises:

a fifth message queue for queuing messages to be delivered to the one or more virtual machines that run the second linkage authority application; and a sixth message queue for queuing messages to be delivered to the one or more compute engines that perform the cryptographic computations required by the second linkage authority application.

7. The certificate management system of claim 5, wherein:

the first plurality of message queues comprises:

a first bidirectional message queue for queuing messages to be delivered to and sent from the one or more virtual machines that run the enrollment certificate authority application; and a second bidirectional message queue for queuing messages to be delivered to and sent from the one or more compute engines that perform the cryptographic computations required by the enrollment certificate authority application;

the second plurality of message queues comprises:

a third bidirectional message queue for queuing messages to be delivered to and sent from the one or more virtual machines that run the first linkage authority application; and a fourth bidirectional message queue for queuing messages to be delivered to and sent from the one or more compute engines that perform the cryptographic computations required by the first linkage authority application; and the third plurality of message queues comprises:

a fifth bidirectional message queue for queuing messages to be delivered to and sent from the one or more virtual machines that run the second linkage authority application; and a sixth bidirectional message queue for queuing messages to be delivered to and sent from the one or more compute engines that perform the cryptographic computations required by the second linkage authority application.

8. The certificate management system of claim 1, wherein:
the one or more application platforms that run the enrollment certificate authority application are communicatively connected to the one or more compute engines that perform the cryptographic computations required by the enrollment certificate authority application by a first load balancer;
the one or more application platforms that run the first linkage authority application are communicatively connected to the one or more compute engines that perform the cryptographic computations required by the first linkage authority application by a second load balancer; and
the one or more application platforms that run the second linkage authority application are communicatively connected to the one or more compute engines that perform the cryptographic computations required by the second linkage authority application by a third load balancer.

9. The certificate management system of claim 8, wherein:
the first load balancer, the second load balancer, and the third load balancer each comprise one or more of a load balancer virtual machine and a load balancer server; and
the load balancer virtual machine and the load balancer server are each configured to distribute workload across a plurality of application platforms and a plurality of compute engines.

10. The certificate management system of claim 9, wherein the load balancer virtual machine and the load balancer server are each configured to distribute workload across the plurality of application platforms and the plurality of compute engines using a round robin technique.

11. The certificate management system of claim 9, wherein the load balancer virtual machine and the load balancer server are each configured to distribute workload across the plurality of application platforms and the plurality of compute engines based on a respective workload reported by each of the plurality of application platforms and each of the plurality of compute engines.

12. The scalable certificate management system of claim 1, wherein the provisioning controller is operable to:
transmit, by the provisioning controller, on behalf of each computerized device, a request for the enrollment certificate to the registration authority application;
receive, by the provisioning controller and from the registration authority application, the enrollment certificate, wherein the enrollment certificate is generated by the enrollment certificate authority application;
transmit, by the provisioning controller, the enrollment certificate to each computerized device;
transmit, by the provisioning controller and on behalf of each computerized device, a request for the pseudonym certificates to the registration authority application;
receive, by the provisioning controller and from the registration authority application, the pseudonym certificates, wherein the pseudonym certificates are generated by the pseudonym certificate authority application;
transmit, by the provisioning controller, the pseudonym certificates to each computerized device;
create and maintain, by the provisioning controller, a log that is associated with each computerized device; and
store, by the provisioning controller, information regarding the certificate activities for each computerized device.

13. The certificate management system of claim 12, wherein the certificate management system is further operable to transmit information regarding certificate activities related to each computerized device to the provisioning controller for storing in the log.

14. The certificate management system of claim 12, wherein the provisioning controller is further operable to authenticate each computerized device before transmitting the request for the enrollment certificate to the registration authority application.

15. The certificate management system of claim 1, wherein an enrollment certificate is a public key certificate identifying a holder of the public key certificate as an authorized participant in an ecosystem including the plurality of computerized devices, and wherein each authorized participant in the ecosystem is able to receive one or more pseudonym certificates that enable communications with the plurality of computerized devices.

16. A method for securely providing certificates to a provisioning controller, the method comprising:
performing cryptographic computations required by a registration authority application;
performing cryptographic computations required by an enrollment certificate authority application, wherein the enrollment certificate authority application generates and conditionally transmits enrollment certificates to the registration authority application, the enrollment certificates being generated in response to receiving requests for the enrollment certificates from the registration authority application;
performing cryptographic computations required by a pseudonym certificate authority application, wherein the pseudonym certificate authority application generates and conditionally transmits pseudonym certificates to the registration authority application, the pseudonym certificates being generated in response to receiving requests for the pseudonym certificates from the registration authority application;
performing cryptographic computations required by a first linkage authority application;
performing cryptographic computations required by a second linkage authority application, wherein the first linkage authority application and the second linkage authority application generate and conditionally transmit linkage values to the registration authority application, the linkage values being generated in response to receiving requests for the linkage values from the registration authority application; and
assigning a digital certificate usage to each computerized device of a plurality of computerized devices, the digital certificate usage indicating a number of the pseudonym certificates to be used within a first time period by each of the computerized devices, and assigning one or more certificate loads to the computerized devices, the one or more certificate loads indicating a number of the pseudonym certificates to be stored within each computerized device during a second time period.

17. A non-transitory computer-readable medium for securely providing certificates to a provisioning controller, the non-transitory computer-readable medium comprising a plurality of instructions that, in response to execution by a processor, cause the processor to perform operations comprising:

performing cryptographic computations required by a registration authority application;

performing cryptographic computations required by an enrollment certificate authority application, wherein the enrollment certificate authority application generates and conditionally transmits enrollment certificates to the registration authority application, the enrollment certificates being generated in response to receiving requests for the enrollment certificates from the registration authority application;

performing cryptographic computations required by a pseudonym certificate authority application, wherein the pseudonym certificate authority application generates and conditionally transmits pseudonym certificates to the registration authority application, the pseudonym certificates being generated in response to receiving requests for the pseudonym certificates from the registration authority application;

performing cryptographic computations required by a first linkage authority application;

performing cryptographic computations required by a second linkage authority application, wherein the first linkage authority application and the second linkage authority application generate and conditionally transmit linkage values to the registration authority application, the linkage values being generated in response to receiving requests for the linkage values from the registration authority application; and assigning a digital certificate usage to each computerized device of a plurality of computerized devices, the digital certificate usage indicating a number of the pseudonym certificates to be used within a first time period by each of the computerized devices, and assigning one or more certificate loads to the computerized devices, the one or more certificate loads indicating a number of the pseudonym certificates to be stored within each computerized device during a second time period.

18. The method of claim 16, wherein each of the registration authority application, the enrollment certificate authority application, the pseudonym certificate authority application, the first linkage authority application, and the second linkage authority application are communicatively connected to each other by a message queuing service comprising a plurality of message queues.

19. The method of claim 16, wherein each enrollment certificate is a public key certificate identifying a holder of the public key certificate as an authorized participant in an ecosystem including the plurality of computerized devices, and wherein each authorized participant in the ecosystem is able to receive one or more pseudonym certificates that enable communications with the plurality of computerized devices.

20. The non-transitory computer-readable medium of claim 17, wherein each enrollment certificate is a public key certificate identifying a holder of the public key certificate as an authorized participant in an ecosystem including the plurality of computerized devices, and wherein each authorized participant in the ecosystem is able to receive one or more pseudonym certificates that enable communications with the plurality of computerized devices.

* * * * *